United States Patent
Schrul et al.

(10) Patent No.: US 11,633,874 B2
(45) Date of Patent: *Apr. 25, 2023

(54) IN-LINE COATED DECORATIVE WOOD-BASED BOARDS

(71) Applicant: OMYA INTERNATIONAL AG, Oftringen (CH)

(72) Inventors: Christopher Schrul, Aarburg (CH); Tomasz Ozyhar, Uitkon (CH)

(73) Assignee: Omya International AG, Oftringen (CH)

( * ) Notice: Subject to any disclaimer, the term of this patent is extended or adjusted under 35 U.S.C. 154(b) by 296 days.

This patent is subject to a terminal disclaimer.

(21) Appl. No.: 16/500,642

(22) PCT Filed: Apr. 4, 2018

(86) PCT No.: PCT/EP2018/058657
§ 371 (c)(1),
(2) Date: Oct. 3, 2019

(87) PCT Pub. No.: WO2018/185195
PCT Pub. Date: Oct. 11, 2018

(65) Prior Publication Data
US 2020/0108524 A1    Apr. 9, 2020

Related U.S. Application Data

(60) Provisional application No. 62/484,949, filed on Apr. 13, 2017.

(30) Foreign Application Priority Data

Apr. 7, 2017 (EP) .................................... 17165463

(51) Int. Cl.
| | | |
|---|---|---|
| *B27N 3/04* | (2006.01) | |
| *C09C 1/02* | (2006.01) | |
| *B27N 3/00* | (2006.01) | |
| *B27N 3/02* | (2006.01) | |
| *B27N 7/00* | (2006.01) | |
| *B32B 21/02* | (2006.01) | |
| *C08K 3/26* | (2006.01) | |

(52) U.S. Cl.
CPC ............. *B27N 3/04* (2013.01); *C09C 1/021* (2013.01); *B27N 3/002* (2013.01); *B27N 3/02* (2013.01); *B27N 7/005* (2013.01); *B32B 21/02* (2013.01); *C01P 2006/12* (2013.01); *C08K 2003/265* (2013.01)

(58) Field of Classification Search
CPC ............ B27N 3/10; B27N 7/005; B32B 21/12
See application file for complete search history.

(56) References Cited

U.S. PATENT DOCUMENTS

| | | | | | |
|---|---|---|---|---|---|
| 3,793,125 | A | * | 2/1974 | Kunz | B32B 21/02 156/62.2 |
| 4,238,438 | A | * | 12/1980 | Laughinghouse | C08L 97/02 162/136 |
| 4,517,228 | A | * | 5/1985 | Matejka | C08L 97/02 427/393 |
| 5,059,264 | A | * | 10/1991 | Sheets | B27N 7/005 156/62.2 |
| 5,422,170 | A | * | 6/1995 | Iwata | B27N 3/005 428/218 |
| 5,616,419 | A | * | 4/1997 | Hsu | C09D 133/06 428/512 |
| 5,705,001 | A |   | 1/1998 | Iwata et al. | |
| 6,010,793 | A | * | 1/2000 | Yoshimura | B27N 7/005 428/537.1 |
| 6,309,492 | B1 | * | 10/2001 | Seidner | B05D 7/06 156/280 |
| 7,919,148 | B2 | * | 4/2011 | Chen | B05D 3/12 427/407.1 |
| 10,618,196 | B2 | * | 4/2020 | Schrul | B27N 3/04 |
| 10,723,885 | B2 | * | 7/2020 | Pohl | A61Q 19/00 |
| 10,780,605 | B2 | * | 9/2020 | Schrul | B27N 1/02 |
| 2004/0036197 | A1 | * | 2/2004 | Janiga | B27N 7/00 264/322 |

(Continued)

FOREIGN PATENT DOCUMENTS

| | | |
|---|---|---|
| DE | 102006024593 A1 | 12/2007 |
| DE | 102008017438 A1 | 10/2009 |

(Continued)

OTHER PUBLICATIONS

Gamaco (Gamaco Technical Date Sheet, 2019) (Year: 2019).*
International Search Report and Written Opinion issued in PCT/EP2018/058657 dated Jul. 10, 2018.

*Primary Examiner* — Liam J Heincer
(74) *Attorney, Agent, or Firm* — Heslin Rothenberg Farley & Mesiti, P.C.

(57) ABSTRACT

The present invention relates to a process for manufacturing a decorative wood-based board, to a decorative wood-based board, to the use of at least one dry or liquid coating composition comprising at least one inorganic particulate filler material and at least one binder for in-line coating of decorative wood-based boards, and to the use of at least one dry or liquid coating composition comprising at least one inorganic particulate filler material and at least one binder for improving the mechanical properties of a decorative wood-based board. Furthermore, it relates to the use of a decorative wood-based board in flooring applications, furniture, walls, roof panels, display cabinets, storage units, loudspeakers and shop-fittings.

28 Claims, 6 Drawing Sheets

(56) References Cited

U.S. PATENT DOCUMENTS

| | | | |
|---|---|---|---|
| 2004/0258898 A1 | 12/2004 | Hume | |
| 2008/0032120 A1 | 2/2008 | Braun | |
| 2009/0169812 A1 | 7/2009 | Fan et al. | |
| 2011/0046284 A1* | 2/2011 | Berube | C09D 7/62 524/322 |
| 2011/0171412 A1 | 7/2011 | Döhring | |
| 2011/0250404 A1 | 10/2011 | Pervan et al. | |
| 2012/0264853 A1* | 10/2012 | Ziegler | B27N 3/18 524/13 |
| 2013/0240137 A1 | 9/2013 | Kalwa | |
| 2014/0272352 A1* | 9/2014 | Tilton | B32B 27/20 428/215 |
| 2014/0370319 A1* | 12/2014 | Vetter | B29C 43/003 428/535 |
| 2015/0197942 A1* | 7/2015 | Pervan | B32B 37/18 428/136 |
| 2015/0197943 A1* | 7/2015 | Ziegler | B44C 1/24 428/161 |
| 2016/0136913 A1 | 5/2016 | Hannig | |
| 2017/0028758 A1* | 2/2017 | Satou | B41M 5/0047 |
| 2017/0157794 A1* | 6/2017 | Eiberweiser | C09D 15/00 |
| 2017/0283619 A1* | 10/2017 | Pohl | C09D 5/00 |
| 2018/0179754 A1* | 6/2018 | Karnicki | B32B 21/06 |
| 2018/0194123 A1* | 7/2018 | Kalwa | B44C 5/04 |
| 2018/0345530 A1* | 12/2018 | Schrul | C04B 26/10 |
| 2019/0210329 A1* | 7/2019 | Ziegler | B32B 21/08 |
| 2020/0016788 A1* | 1/2020 | Schrul | B27N 3/02 |
| 2020/0108524 A1* | 4/2020 | Schrul | B27N 3/06 |
| 2020/0215717 A1* | 7/2020 | Schrul | B27N 3/04 |
| 2020/0346364 A1* | 11/2020 | Kalwa | B05C 19/04 |

FOREIGN PATENT DOCUMENTS

| | | | |
|---|---|---|---|
| EP | 0094922 A1 | 11/1983 | |
| EP | 2105320 A1 | 9/2009 | |
| EP | 2196508 A1 | 6/2010 | |
| EP | 2226201 A1 | 9/2010 | |
| EP | 2589488 A1 | 5/2013 | |
| EP | 2944621 A1 | 11/2015 | |
| EP | 3173201 A1 | 5/2017 | |
| EP | 3189952 A1 | 1/2018 | |
| JP | S4855272 A | 8/1973 | |
| JP | 2014/125586 A | 7/2014 | |
| WO | WO-9622338 A2 * | 7/1996 | C09D 133/06 |
| WO | 2006042651 A1 | 4/2006 | |
| WO | 2008061765 A1 | 5/2008 | |
| WO | 2009065769 A2 | 5/2009 | |
| WO | 20121113876 A1 | 8/2012 | |
| WO | 2015/067522 A1 | 5/2015 | |
| WO | 2016/071007 A1 | 5/2016 | |
| WO | 2017118611 A1 | 7/2017 | |

* cited by examiner

IN-LINE COATED DECORATIVE WOOD-BASED BOARDS

CROSS REFERENCE TO RELATED APPLICATIONS

This application is a U.S. National Phase filing under 35 U.S.C. § 371 of International Application PCT/EP2018/058657, filed Apr. 4, 2018. PCT/EP2018/058657 claims priority from European application number 17165463.5, filed Apr. 7, 2017 and U.S. provisional patent application No. 62/484,949, filed Apr. 13, 2017. The entire contents of each of these applications are hereby expressly incorporated herein by reference.

The present invention relates to a process for manufacturing a decorative wood-based board, to a decorative wood-based board, to the use of at least one dry or liquid coating composition comprising at least one inorganic particulate filler material and at least one binder for in-line coating of decorative wood-based boards, and to the use of at least one dry or liquid coating composition comprising at least one inorganic particulate filler material and at least one binder for improving the mechanical properties of a decorative wood-based board. Furthermore, it relates to the use of a decorative wood-based board in flooring applications, furniture, walls, roof panels, display cabinets, storage units, loudspeakers and shop-fittings.

Decorative wood-based boards are widely used for indoor applications such as in furniture, doors, flooring, houses, wall lining, acoustic enclosures, stair treads or paneling substrates due to their reasonable costs, wide range and flexibility of application, consistency in strength, dimension stability, good processability and the variability in their decorative finishing. Such wood-based boards are composite products comprising mainly wood particles or wood fibres which are joined together, with or without using binder, under heat and pressure. A subsequent decorative treatment of such raw wood-based boards by lacquering, application of decorative paper or foil, or direct printing provides the wood-based boards with an appealing custom made design.

Such boards and methods for preparing same are described in a number of documents. For example, US 2011/0171412 A1 relates to a direct printed lightweight panel, in particular a flooring panel, comprising a lightweight MDF or LDF carrier board with a density of ≤750 kg/m3; a decor layer printed onto the carrier board; and a transparent protective coating. The different layers and coatings are applied in such a manner so that surface structures and/or optical characteristics of the carrier board are at least partially visible and thereby incorporated into the design of the decor layer. US 2013/0240137 A1 refers to a method for applying a decoration to the upper face of a composite wood board, in particular a MDF or HDF board, wherein said method is characterized in that at least one second decoration produced by digital printing is applied to a first decoration produced by intaglio printing. EP 2 589 488 A1 discloses a carrier-attached copper foil to be used upon producing a laminated plate, and aims to realize the improvement in the handling ability in the production process of a printed board and cost reduction based on an improved production yield. EP 2 196 508 A1 relates to a block layer for varnishing unpolished or polished surfaces of wood material boards comprising a silane primer (8 to 12 g/m2), and a filler additive with nano-grain size of 20 wt.-% to the primer, where the silane is obtained by hydrolysis and condensation and is used as an aqueous solution. DE 10 2008 017 438 A1 refers to a coated wooden floor panel characterized in that the coating is a coating that exhibits a vibration absorption in the range of 8 s to 22 s as measured in accordance with EN ISO 1522. WO 2008/061765 A1 discloses a method for coating a board of wood-based material, in particular a board of real wood, a plywood board or a board for parquet flooring, with a flowable plastics material. The method comprises applying the plastics material as a single, thick layer to the board of wood-based material and creating an impressed structure by means of a material web or a structure roller. After creating the impressed structure, the plastics material is cured to produce a wear-resistant surface. US 2008/0032120 A1 relates to a panel made of a wooden material with a surface coating having an undercoat which is applied to the wooden material and at least one lacquer coating and a functional component. There is produced a panel made of a wooden material with a low-cost surface coating which can be applied easily and is optically appealing. Finally, EP 2 105 320 A1 refers to a method for finishing wood-based panels, especially MDF or HDF panels, involving a sealing with melamine resin and printing a pattern directly onto the sealing layer before adding a protective layer of melamine resin and hot-pressing. A method for finishing sheets of wood or timber products, especially MDF or HDF sheet, involves (a) coating the top of the sheet with a sealing layer of melamine resin, (b) printing a pattern onto the sealing layer, (c) coating the pattern with a protective layer of melamine resin and (d) pressing the sheet at elevated temperature until the layers melt and bond together with the printed pattern between them. WO 2006/042651 A1 refers to light-coloured to white wooden material panels being produced from bleached wood fibres and/or vat-dyed with a white pigment. DE 43 10 191 A1 relates to wood-based panel boards including inorganic cellular materials and flame retardant. The inorganic cellular material comprises a cellular material made from inorganic materials. For example, these may be materials having an inorganic oxide such as silicon oxide or aluminium oxide as the principle component, with a granular structure filled with minute closed cells. U.S. Pat. Nos. 5,422,170 A and 5,705,001 A refer to wood based panels for which wood fibre, inorganic cellular material, flame retardant and an organic binder for binding these materials, are mixed together and hot press formed to give the wood based panel. US 2004/0258898 A1 relates to a method for fabricating fire retardant composite panels comprising: creating a water-based slurry of partially soluble boron salts; adding an adhesive to a ligneous material; and independently introducing said water-based slurry to said igneous material for fire retarding thereof. US 2009/169812 A1 refer to a process for making composite products from waste material comprises the steps of a) obtaining fibrous material produced by the thermal treatment of waste materials with pressurised steam; b) mixing the fibrous material with a binding material; c) forming the resulting mixture into a shape; d) pressing the shaped mixture under pressure; and e) hardening the mixture; wherein the process also comprises the steps of the separating out the fibrous material and deodorising the fibrous material. U.S. Pat. No. 5,705,001 A refers to a method of manufacturing a wood based panel comprising the steps of: mixing wood fibres, an inorganic cellular material, and a flame retardant, wherein the mixture proportions per 100 parts by weight of said wood fibres being at least 50 parts by weight of said inorganic cellular material, and 15 parts to 60 parts by weight of said flame retardant; applying a binder to the mixture; and subsequently hot press forming the mixture to form the wood based panel, wherein the wood fibres are a major component and the steps are carried out so that the wood based panel possesses a density of 0.27 g·cm-3 or less. Unpublished European patent application EP 15 196 997.9 refers to a particle board comprising a) a wood particle base layer having a first side and a reverse side, the wood particle base layer comprising i) wood particles in an amount from 60.0 to 97.5 parts by weight (d/d) and at least one particulate calcium carbonate-containing material in an amount from 2.5 to 40.0 parts by weight (d/d), based on the total dry weight of the wood particles and at least one particulate calcium carbonate-containing material of the wood particle base layer, and b) at least one wood particle surface layer being in contact with the first and/or reverse side of the wood particle base layer, the at least one wood particle surface layer comprising i) wood particles in an amount from 70.0 to 97.5 parts by weight (d/d) and at least one particulate calcium carbonate-containing material in an amount from 2.5 to 30.0 parts by weight (d/d), based on the total dry weight of the wood particles and the at least one particulate calcium carbonate-containing material of the at least one wood particle surface layer, wherein the sum of the amount of the wood particles and the at least one particulate calcium carbonate-containing material in each of the wood particle base layer and the at least one wood particle surface layer is 100.0 parts by weight (d/d), based on the total dry weight of the wood particles and the at least one particulate calcium carbonate-containing material in the layer. Unpublished European patent application EP 16 150 612.6 refers to a process for manufacturing a wood-based board, a wood-based board as use of a liquid coating composition comprising at least one particulate filler material and at least one binder for in-line coating of wood-based boards. EP 2 944 621 A1 refers to a fiber board product comprising a) fibers in an amount from 50.0 to 99.0 parts by weight (d/d), based on the total dry weight of the fibers and the at least one particulate calcium carbonate-containing material, wherein the fibers in an amount of i) 0 to 20.0 wt.-%, based on the total amount of dry fibers, are of a size which is fractioned at a mesh sieve width of 0.05 mm, ii) 50.0 to 90.0 wt.-%, based on the total amount of dry fibers, are of a size which is fractioned at a mesh sieve width of 1.0 mm, and iii) 70.0 to 100.0 wt.-%, based on the total amount of dry fibers, are of a size which is fractioned at a mesh sieve width of 3.0 mm, as determined by sieve analysis, b) at least one particulate calcium carbonate-containing material in an amount from 1.0 to 50.0 parts by weight (d/d), based on the total dry weight of the fibers and the at least one particulate calcium carbonate-containing material, the at least one particulate calcium carbonate-containing material having a weight median particle size d50 of 0.5 to 150.0 μm, and additionally c) at least one binder in an amount from 0.05 to 25.0 parts by weight (d/d), based on the total dry weight of the fibers and the at least one particulate calcium carbonate-containing material, and d) at least one wax in an amount from 0 to 5.0 parts by weight (d/d), based on the total dry weight of the fibers and the at least one particulate calcium carbonate-containing material, wherein the sum of the amount of the fibers and the at least one particulate calcium carbonate-containing material is 100.0 parts by weight (d/d), based on the total dry weight of the fibers and the at least one particulate calcium carbonate-containing material. EP 2 226 201 A1 refers to a method involving scattering a layer of wood fibers glued with resin, by a scattering device to form a fiber cake, and compressing the fiber cake under pressure and temperature. The fiber cake is conveyed by a conveyor device in a process direction to a pressing device in which the fiber cake is pressed to form a wood-fiber board of desired thickness. A printing device is arranged above the conveyor device, and positioned between the scattering device and the pressing device. A pattern is applied to the fiber cake before hot pressing.

Even though a great variety of decorative wood-based boards is already available on the market having tailored properties including strength, elastic properties, optical properties and further processability, a general disadvantage of said decorative wood-based boards is that their manufacturing requires energy-, cost- and time-consuming processing steps for surface preparation of the wood-based board prior to the decorative treatment. In particular, the produced raw wood-based boards are typically surface-treated after hot pressing by sanding, levelling, the application of primers, adhesives and/or paper layers in order to improve the surface characteristics and/or mechanical properties of the board for a subsequent decorative treatment. Such decorative treatments may be, for example, lacquering, laminating with printed and/or impregnated decorative paper, foil or veneer, or direct printing on the board by inkjet printing, rotogravure printing etc. Furthermore, it is common in the art to apply a backing layer or balancing layer, for example, in form of a backing paper, on the side of the board opposite to the decoration to improve the mechanical properties of the board. This additional processing step is usually necessary to impart an even surface to the reverse side of the board to allow a proper bonding to a substrate or to avoid that the board warps under the tension caused by the decorative finishing, e.g. a decorative paper, on the first side. Another disadvantage is that manufacturing processes of decorative boards for flooring application usually require relatively expensive high-density fibre boards as raw base material to provide an increased surface soundness and Brinell hardness.

The above-cited prior art, however, does not specifically focus on the provision of efficient manufacturing methods for decorative wood-based boards and especially does not mention a process that provides decorative wood-based boards which avoids or at least reduces the need for energy-, cost- and time-consuming (post) processing steps for surface preparation such as sanding, levelling, the application of primers or adhesives, and/or balancing layers.

Therefore, there is a continuous need in the art for processes for the manufacturing of decorative wood-based boards which avoid the implementation of (post) processing steps for surface preparation of the raw wood-based board prior to a decorative treatment. There is also a need for processes which provide decorative wood-based boards with improved surface characteristics, for example, optical properties or physical properties, compared to existing decorative wood-based boards. In addition, novel processes for the manufacturing of decorative wood-based boards are of particular interest which provide decorative wood-based boards with maintained or even improved mechanical properties such as bending strength and modulus of elasticity, internal bond strength, thickness swelling, elastic properties.

Furthermore, there is a continuous need in the art for decorative wood-based boards having improved surface characteristics such as optical characteristics, especially brightness or image quality, or an increased surface density. Moreover, decorative wood-based boards are required where the important mechanical properties such as bending strength and modulus of elasticity, internal bond strength, thickness swelling, elastic properties and further processability are maintained or even improved.

Accordingly, it is an objective of the present invention to provide an improved process for the manufacturing of a decorative wood-based board. A further objective is to provide a process for the manufacturing of a decorative wood-based board which avoids or reduces the need of processing steps for the surface preparation of the wood-based board prior to a decorative treatment, especially direct printing or an application of a decorative paper. Another objective is to provide a process for the manufacturing of a decorative wood-based board that can be carried out under energy-, cost- and time-efficient conditions, i.e. by avoiding (post) processing steps. A further objective is to provide a process for the manufacturing of a decorative wood-based board having improved surface characteristics, especially optical characteristics, such as surface brightness or quality of a printed image, or physical properties, such as an increased surface density. Yet another objective is to provide a process for the manufacturing of a decorative wood-based board which allows the provision of a decorative wood-based board in which the set of important mechanical properties such as bending strength and modulus of elasticity, internal bond strength, thickness swelling, elastic properties and further processability is maintained or even improved, preferably with respect to the international DIN standards. Further objectives can be gathered from the following description of the invention.

One or more of the foregoing objectives is/are solved by the present invention. According to a first aspect the present invention relates to a process as defined in independent claim 1.

Advantageous embodiments of the inventive process for the manufacturing of a decorative wood-based board are defined in the corresponding sub-claims. When in the following reference is made to embodiments of the present invention, it is to be understood that these embodiments refer to the inventive process, the inventive wood-based board and the inventive use and that these embodiments are also disclosed in combination.

According to one aspect of the present application a process for manufacturing a decorative wood-based board is provided. The process comprising the steps of:
  a) providing wood particles and/or fibres, in dry form or in form of an aqueous suspension,
  b) providing at least one dry or liquid coating composition comprising at least one inorganic particulate filler material and at least one binder,
  c) forming a wood-based mat having a first side and a reverse side from the wood particles and/or fibres provided in step a),
  d) pre-pressing the wood-based mat of step c) into a pre-pressed wood-based mat,
  e) applying at least one layer of the at least one dry or liquid coating composition of step b) on the first and/or reverse side of the pre-pressed wood-based mat obtained in step d),
  f) hot pressing the pre-pressed wood-based mat obtained in step e) into a solid wood-based board,
  g) applying at least one decorative finishing on the first and/or reverse side of the wood-based board obtained in step f) by inkjet-printing, by rotogravure-printing, by applying a decorative paper, a decorative foil or a liquid coating.

The inventors surprisingly found out that by the foregoing process it is possible to prepare decorative wood-based boards with excellent surface characteristics without implementing further processing steps. Thus, there is no or less need for common surface preparation steps after hot-pressing of the raw wood-based board, e.g. sanding or application of primers, to prepare the surface for a subsequent decorative finishing. The possibility to directly apply a decorative treatment to the surface of a hot-pressed board allows for more efficient, economical, waste economical production processes for decorative wood-based boards. The inventors also found that the application of a layer of the coating composition according to step e) of the invention provides a wood-based board with improved mechanical properties. This has, for example, the advantage that the coating layer may serve as a substitute for balancing layers such as backing papers commonly used in the art of manufacturing decorative wood-based boards. The inventors also surprisingly found that by the inventive process a decorative wood-based board with a high surface density on the coated side can be manufactured even when the board is based on low or medium density wood-based boards such as particle board, oriented strand board or medium density fibre board. This makes the inventive decorative wood-based board an alternative to relatively expensive high density fibreboard, for example, in flooring applications. Furthermore, by the process according to the present invention a decorative wood-based board is provided, wherein the decorative wood-based board has improved surface characteristics, and especially improved optical characteristics.

According to one embodiment of the present invention, the wood particles and/or fibres of step a) originate from primary wood sources, preferably softwood tree species, hardwood tree species, non-wood fibre plants, or secondary wood sources, preferably recycled wood, and mixtures thereof.

According to another embodiment of the present invention, the wood particles and/or fibres of step a) are combined simultaneously or separately in any order with at least one base binder and/or at least one additive, preferably the at least one base binder is selected from the group comprising phenol-formaldehyde resin (PF), urea-formaldehyde resin (UF), melamine-formaldehyde resin (MF), melamine-urea-formaldehyde resin (MUF), urea-melamine-formaldehyde resin (UMF), urea-melamine-phenol-formaldehyde resin (UMPF), epoxy resin, methylene diphenyl diisocyanate resin (MDI), polyurethane resin (PU), resorcinol resin, starch or carboxymethylcellulose and mixtures thereof, and/or the at least one additive is selected from the group comprising waxes, colourants, filler, dispersants, biocides, hardener, flame retardants and mixtures thereof.

According to yet another embodiment of the present invention, the wood particles of step a) are wood chips.

According to one embodiment of the present invention, the at least one inorganic particulate filler material of step b) is selected from the group consisting of dolomite, ground calcium carbonate (GCC), preferably ground calcium carbonate (GCC) selected from the group comprising marble, chalk, limestone and mixtures thereof, precipitated calcium carbonate (PCC), preferably precipitated calcium carbonate (PCC) selected from the group comprising one or more of the aragonitic, vateritic and calcitic mineralogical crystal forms, modified calcium carbonate (MCC), magnesium hydroxide, talc, gypsum, titanium dioxide, kaolin, silicate, mica, barium sulphate, calcined clay, non-calcined (hydrous) clay, bentonite, inorganic pigments and mixtures thereof.

According to another embodiment of the present invention, the at least one inorganic particulate filler material of step b) is provided i) in powder form, or ii) in form of an aqueous slurry comprising the filler material in an amount from 1.0 to 80.0 wt.-%, preferably from 30.0 to 78.0 wt.-%, more preferably from 40.0 to 78.0 wt.-% and most preferably from 45.0 to 78.0 wt.-%, based on the total weight of the aqueous slurry.

According to yet another embodiment of the present invention, the at least one inorganic particulate filler material of step b) is at least one inorganic particulate calcium carbonate-containing material having a median particle size d50 from 0.1 µm to 150.0 µm, more preferably from 0.2 µm to 100.0 µm and most preferably from 0.3 µm to 50.0 µm and/or a specific surface area of from 0.5 to 200.0 m2/g, more preferably of from 0.5 to 100.0 m2/g and most preferably of from 0.5 to 75.0 m2/g as measured by the BET nitrogen method.

According to one embodiment of the present invention, the at least one binder of step b) is selected from the group consisting of alkyd resin, epoxy resin, epoxy ester resin, poly(vinyl alcohol), poly(vinyl pyrrolidone), poly(vinyl acetate), poly(oxazolines), poly(vinylacetamides), partially hydrolyzed poly(vinyl acetate/vinyl alcohol), poly((meth) acrylic acid), poly((meth)acrylamide), poly(alkylene oxide), polyether, saturated polyester, sulfonated or phosphated polyesters and polystyrenes, poly(styrene-co-(meth)acrylate), poly(styrene-co-butadiene), polyurethane latex, poly(n-butyl (meth)acrylate), poly(2-ethylhexyl (meth)acrylate), copolymers of (meth)acrylates, such as n-butyl(meth)acrylate and ethyl(meth)acrylate, copolymers of vinylacetate and n-butyl(meth)acrylate casein, copolymers of polyvinylchloride, gelatin, cellulose ethers, zein, albumin, chitin, chitosan, dextran, pectin, collagen derivatives, collodian, agar-agar, arrowroot, guar, carrageenan, starch, tragacanth, xanthan, or rhamsan and mixtures thereof.

According to another embodiment of the present invention, the at least one dry or liquid coating composition of step b) comprises the at least one inorganic particulate filler material in an amount from 60 to 98 wt.-%, preferably 70 to 98 wt.-%, most preferably 80 to 98 wt.-% and the at least one binder in an amount from 2 to 40 wt.-%, preferably 2 to 30 wt.-%, most preferably 2 to 20 wt.-%, based on the total dry weight of the at least one coating composition.

According to yet another embodiment of the present invention, the at least one dry or liquid coating composition of step b) further comprises at least one compound selected from the group comprising matting agents, coalescing agents or film forming agents, anti-foaming agents, dispersants, rheology agents, cross-linking agents, biocides, light stabilizer, preserving agents, hardener, flame retardants, release agents containing waxes or fats, and mixtures thereof, preferably the at least one dry or liquid coating composition of step b) comprises the at least one compound in an amount from 2.0 to 8.0 wt.-%, e.g. from 3.0 to 7.0 wt.-%, based on the total dry weight of the at least one coating composition.

According to one embodiment of the present invention, a single or multi-layer wood-based mat is formed in step c).

According to another embodiment of the present invention, pre-pressing step d) is carried out at ambient temperature, e.g. from 10 to 60° C., more preferably from 15 to 30° C., and/or a pressure ranging from 5 to 40 bar, preferably from 8 to 35 bar.

According to yet another embodiment of the present invention, coating step e) is carried out by metering size press, curtain coating, spray coating or roller coating.

According to one embodiment of the present invention, coating step e) is carried out on the first and reverse side of the pre-pressed wood-based mat to manufacture a decorative wood-based board being coated on the first and the reverse side, and/or coating step e) is carried out a second time using a different or the same liquid coating composition of step b).

According to another embodiment of the present invention, hot pressing step f) is carried out at a temperature ranging from 130 to 260° C., more preferably from 160 to 240° C.

According to yet another embodiment of the present invention, the decorative wood-based board is a fibre board product, preferably a high-density fibre (HDF) board, medium-density fibre (MDF) board, low-density fibre (LDF) board, a particle board, an oriented strandboard (OSB), a hardboard, or an insulation board.

According to yet another embodiment of the present invention, in step g) the at least one decorative finishing is applied as a liquid coating being a lacquer layer.

According to another embodiment of the present invention, the process comprises the further steps
h) applying at least one protective layer on the at least one decorative finishing obtained in step g), and/or
i) in case that the at least one decorative finishing is only present on one side, applying at least one backing layer on the side of the decorative wood-based board opposite to the at least one decorative finishing, preferably in form of a paper.

According to another embodiment of the present invention, the at least one protective layer comprises a transparent non-thermoplastic resin, preferably selected from the group consisting of urea-formaldehyde resins, melamine-resins, epoxy-resins and mixtures thereof.

According to another aspect of the present invention, a decorative wood-based board is provided. The decorative wood-based board comprising
a) a base of wood particles and/or fibres as defined in any one of claims 1 to 3,
b) at least one coating layer on the first and/or reverse side of the solid wood-based board, wherein the coating comprises
  i) at least one inorganic particulate filler material, as defined in any one of claim 1, 4, 5 or 7, having a ratio of particle size $d_{80}$ to particle size $d_{20}$ [$d_{80}/d_{20}$] from 0.5 to 1.0, and
  ii) at least one binder as defined in any one of claim 1, 6 or 7,
c) at least one decorative finishing on the first and/or reverse side of the wood-based board.

According to one embodiment of the present decorative wood-based board, the at least one coating is at least partially penetrated into the surface of the wood-based board.

According to another embodiment of the present decorative wood-based board, the at least one decorative finishing is present on the coating layer on the first and/or reverse side of the wood-based board.

According to another embodiment of the present decorative wood-based board, the at least one decorative finishing is present on one side of the wood-based board and the at least one coating layer is present on the opposite side of the wood-based board and represents a backing layer or is part of a backing layer.

According to another embodiment of the present decorative wood-based board, the at least one inorganic particulate filler material has i) a particle size d98 of <500 ii) a particle size d80 of 0.1 to 250 iii) a median particle size d50 of 0.1 to 150 µm, and iv) a particle size d20 of 0.1 to 50 µm.

According to yet another embodiment of the present decorative wood-based board, the surface of the coated side of the wood-based board has i) a brightness from 50 to 100%, according ISO R457 (Tappi452) and DIN 6167, ii) a yellowness from 2 to 70%, according ISO R457 (Tappi452)

and DIN 6167, iii) L* from 50 to 100, according to DIN EN ISO 11664-4:2012, iv) a* from −5 to 10, according to DIN EN ISO 11664-4:2012, and v) b* from 0 to 30, according to DIN EN ISO 11664-4:2012.

According to one embodiment of the present decorative wood-based board, the at least one coated surface of the decorative wood-based board has i) a maximum roughness amplitude Sz from 20 to 800 µm, ii) an arithmetic mean roughness Sa from 2 to 80 µm, and iii) a root mean square roughness Sq from 2 to 20 µm.

According to another embodiment of the present decorative wood-based board, the at least one inorganic particulate filler material has i) a particle size d98 of <500 ii) a particle size d80 of 0.1 to 250 iii) a median particle size d50 of 0.1 to 150 µm, and iv) a particle size d20 of 0.1 to 50 µm, and the surface of the coated side of the decorative wood-based board has i) a brightness from 50 to 100%, according ISO R457 (Tappi452) and DIN 6167, ii) a yellowness from 2 to 70%, according ISO R457 (Tappi452) and DIN 6167, iii) L* from 50 to 100, according to DIN EN ISO 11664-4:2012, iv) a* from −5 to 10, according to DIN EN ISO 11664-4:2012, and v) b* from 0 to 30, according to DIN EN ISO 11664-4:2012, and i) a maximum roughness amplitude Sz from 20 to 800 µm, ii) an arithmetic mean roughness Sa from 2 to 80 µm, and iii) a root mean square roughness Sq from 2 to 20 µm.

According to one embodiment of the present decorative wood-based board, the decorative wood-based board is a fibre board product, preferably a high-density fibre (HDF) board, medium-density fibre (MDF) board, low-density fibre (LDF) board, a particle board, an oriented strandboard (OSB), a hardboard, or an insulation board.

According to another embodiment of the present decorative wood-based board, the decorative wood-based board has a bending strength of ≥5 N/mm2, preferably from 10 to 50 N/mm2 and most preferably from 15 to 45 N/mm2; and/or a modulus of elasticity of ≥500 N/mm2, preferably from 1 000 to 4 500 N/mm2 and most preferably from 1 500 to 3 500 N/mm2; and/or an internal bond strength of ≥0.10 N/mm2, more preferably from 0.2 to 1.4 N/mm2 and most preferably from 0.4 to 1.2 N/mm2; and/or a thickness swelling after 24 h water storage of ≤20%, more preferably from 2.0 to 15.0% and most preferably from 4.0 to 10%; and/or a brightness of at least 50%, more preferably of at least 65%, even more preferably of at least 75% and most preferably of at least 80%.

According to another embodiment of the present wood-based board, the at least one coated side of the decorative wood-based board has a surface density ranging from 900 to 2 500 kg/m3, preferably from 1 200 to 2 400 kg/m$^3$ and most preferably from 1 600 to 2 300 kg/m3.

According to another embodiment of the present decorative wood-based board, the decorative wood-based board further comprises
d) at least one protective layer on the at least one decorative finishing and/or
e) in case that the at least one decorative finishing is only present on one side, at least one backing layer on the side of the decorative wood-based board opposite to the at least one decorative finishing, preferably in form of a paper.

According to another embodiment of the present decorative wood-based board, the at least one protective layer comprises a transparent non-thermoplastic resin, preferably selected from the group consisting of urea-formaldehyde resins, melamine-resins, epoxy-resins and mixtures thereof.

According to another aspect of the present invention, the use of at least one dry or liquid coating composition as defined herein for in-line coating of decorative wood-based boards, is provided.

According to another aspect of the present invention, the use of at least one dry or liquid coating composition as defined herein for improving the mechanical properties of a decorative wood-based board and especially the bending strength, modulus of elasticity, internal bond strength and/or thickness swelling, is provided.

According to yet another aspect of the present invention, a use of a decorative wood-based board as defined herein in flooring applications, furniture, walls, preferably wall panels, roof panels, display cabinets, storage units, loudspeakers, preferably loudspeaker boxes and shop-fittings, is provided.

It should be understood that for the purposes of the present invention, the following terms have the following meanings:

A "suspension" or "slurry" in the meaning of the present invention comprises insoluble solids and a solvent or liquid, preferably water, and optionally further additives such as dispersants, biocides and/or thickener, and usually contains large amounts of solids and, thus, is more viscous and can be of higher density than the liquid from which it is formed.

The term "aqueous" suspension or slurry refers to a system, wherein the liquid phase comprises, preferably consists of, water. However, said term does not exclude that the liquid phase of the aqueous slurry or suspension comprises minor amounts of at least one water-miscible organic solvent selected from the group comprising methanol, ethanol, acetone, acetonitrile, tetrahydrofuran and mixtures thereof. If the aqueous suspension or slurry comprises at least one water-miscible organic solvent, the liquid phase of the aqueous slurry comprises the at least one water-miscible organic solvent in an amount of from 0.1 to 40.0 wt.-% preferably from 0.1 to 30.0 wt.-%, more preferably from 0.1 to 20.0 wt.-% and most preferably from 0.1 to 10.0 wt.-%, based on the total weight of the liquid phase of the aqueous suspension or slurry. For example, the liquid phase of the aqueous suspension or slurry consists of water. If the liquid phase of the aqueous suspension or slurry consists of water, the water to be used can be any water available such as tap water and/or deionised water.

For the purpose of the present application, "water-insoluble" materials are defined as materials which, when 100 g of said material is mixed with 100 g deionised water and filtered on a filter having a 0.2 □m pore size at 20° C. to recover the liquid filtrate, provide less than or equal to 0.1 g of recovered solid material following evaporation at 95 to 100° C. of 100 g of said liquid filtrate at ambient pressure. "Water-soluble" materials are defined as materials which, when 100 g of said material is mixed with 100 g deionised water and filtered on a filter having a 0.2 □m pore size at 20° C. to recover the liquid filtrate, provide more than 0.1 g of recovered solid material following evaporation at 95 to 100° C. of 100 g of said liquid filtrate at ambient pressure.

The term "did" in the meaning of the present invention refers to the dry amount of additive based on the dry amount of the defined material.

The term "inorganic" particulate filler material in the meaning of the present invention refers to material that does not contain carbon-carbon bonds and that is not derived from living matter.

The term inorganic "particulate" filler material refers to separate and distinct solid particles of the inorganic filler material.

The term "filler material" refers to natural or synthetic substances added to materials, such as paper, plastics, rubber, paints and adhesives etc., to lower the consumption of more expensive materials such as binders, or to enhance technical properties of the products. The person skilled in the art very well knows the typical fillers used in the respective fields.

The term "binder" as used in the present invention is a compound or compound mixture that is conventionally used to bind together the particles of one material or to bind together the particles of one material with the particles of two or more other materials to form a composite.

For the purpose of the present invention, the particle diameter "dx" represents the diameter relative to which x % by weight of the particles have diameters less than dx. This means that the d20 value is the particle size at which 20% of all particles are smaller, and the d80 value is the particle size at which 80% of all particles are smaller. The d50 value is thus the median particle size, i.e. 50% of all grains are smaller than this particle size. For example, the d50 (wt.) value is the weight median particle size, i.e. 50 wt.-% of all grains are smaller than this particle size, and the d50 (vol.) value is the volume median particle size, i.e. 50 vol.-% of all grains are smaller than this particle size. For the purpose of the present invention, the "particle sizes" of particles having a median particle size d50 of >45 μm were determined from the volume determined particle size distributions. Furthermore, the "particle sizes" of particles having a median particle size d50 of ≤45 μm were determined from the weight determined particle size distributions. It is thus appreciated that the particle sizes given throughout the present application are based on the combination of the weight and volume determined particle sizes if the particles comprise particles having a median particle size d50 of ≤45 μm and of >45 μm. For determining the weight median particle size d50 value a Sedigraph, such as a Sedigraph™ 5120 or a Sedigraph™ 5100 of Micromeritics Instrument Corporation, can be used, i.e. the sedimentation method. The volume median particle size d50 value of the at least one inorganic particulate filler material was measured by laser diffraction. In this method, the particle size is determined by measuring the intensity of light scattered as a laser beam passes through a dispersed particulate sample. The measurement was made with a Mastersizer 2000 or a Mastersizer 3000 of Malvern Instruments Ltd. (operating instrument software version 1.04). The weight determined particle size distribution corresponds to the volume determined particle size distribution if the particles are spherical and of constant density throughout the particle size distribution.

Where the term "comprising" is used in the present description and claims, it does not exclude other non-specified elements of major or minor functional importance. For the purposes of the present invention, the term "consisting of" is considered to be a preferred embodiment of the term "comprising of". If hereinafter a group is defined to comprise at least a certain number of embodiments, this is also to be understood to disclose a group, which preferably consists only of these embodiments.

Whenever the terms "including" or "having" are used, these terms are meant to be equivalent to "comprising" as defined above.

Where an indefinite or definite article is used when referring to a singular noun, e.g. "a", "an" or "the", this includes a plural of that noun unless something else is specifically stated.

Terms like "obtainable" or "definable" and "obtained" or "defined" are used interchangeably. This e.g. means that, unless the context clearly dictates otherwise, the term "obtained" does not mean to indicate that e.g. an embodiment must be obtained by e.g. the sequence of steps following the term "obtained" even though such a limited understanding is always included by the terms "obtained" or "defined" as a preferred embodiment.

As set out above, the inventive process for manufacturing a decorative wood-based board comprises at least the process steps of a), b), c), d), e), f) and g). In the following, it is referred to further details of the present invention and especially the foregoing steps of the inventive process for manufacturing a decorative wood-based board.

Characterization of step a): provision of wood particles and/or fibres

According to step a) of the process of the present invention, wood particles and/or fibres, in dry form or in form of an aqueous suspension, are provided.

Thus, it is one requirement that wood particles and/or fibres are provided.

It is appreciated that the wood particles may comprise one or more kinds of wood particles.

Accordingly, the wood particles may comprise one kind of wood particles. Alternatively, the wood particles comprise a mixture of two or more kinds of wood particles. For example, the wood particles comprise a mixture of two or three kinds of wood particles. Preferably, the wood particles comprise one kind of wood particles.

It is appreciated that the wood particles present according to the present invention are not restricted to specific wood particles as long as they are suitable for the preparation of wood-based boards.

Preferably, the wood particles are wood-based particles. The term "wood-based" particles in the meaning of the present invention refers to the common definition, i.e. wood is the fibrous, hard substance making up most of the tree trunk and branches of softwood and hardwood tree species.

Such wood-based particles can be any wood-based particles well known to the skilled person and typically used in wood-based boards.

For example, the wood particles originate from primary wood sources such as softwood tree species, hardwood tree species, non-wood fibre plants and mixtures thereof. Additionally or alternatively, the wood particles originate from secondary wood sources such as recycled wood.

The wood particles can be of specific dimensions. For example, the wood particles have
  i) a particle length in the range from 0.4 to 15 mm, more preferably from 3 to 15 mm and most preferably from 5 to 15 mm, and/or
  ii) a particle thickness in the range from 0.1 to 2.0 mm, more preferably from 0.2 to 1.5 mm and most preferably from 0.25 to 1.0 mm, and/or
  iii) a ratio of particle length to particle thickness of from 2 to 60 mm, more preferably from 5 to 60 mm and most preferably from 10 to 60 mm.

It is appreciated that the particle "length" refers to the longest dimension of the wood particles. The term particle "thickness" refers to the shortest dimension of the wood particles. It is appreciated that the length or thickness refers to the average length or average thickness.

Preferably, the wood particles have
  i) a particle length in the range from 0.4 to 15 mm, more preferably from 3 to 15 mm and most preferably from 5 to 15 mm, or
  ii) a particle thickness in the range from 0.1 to 2.0 mm, more preferably from 0.2 to 1.5 mm and most preferably from 0.25 to 1.0 mm, or iii) a ratio of particle length to particle thickness of from 2 to 60 mm, more preferably from 5 to 60 mm and most preferably from 10 to 60 mm.

Alternatively, the wood particles have
i) a particle length in the range from 0.4 to 15 mm, more preferably from 3 to 15 mm and most preferably from 5 to 15 mm, and
ii) a particle thickness in the range from 0.1 to 2.0 mm, more preferably from 0.2 to 1.5 mm and most preferably from 0.25 to 1.0 mm, and
iii) a ratio of particle length to particle thickness of from 2 to 60 mm, more preferably from 5 to 60 mm and most preferably from 10 to 60 mm.

In one embodiment, the wood particles have a median particle size d50 in the range from 0.4 to 15 mm, more preferably from 3 to 15 mm and most preferably from 5 to 15 mm.

Additionally or alternatively, the wood particles have a particle size d90 in the range from 2 to 60 mm, more preferably from 5 to 60 mm and most preferably from 10 to 60 mm.

Specific examples of wood particles include cottonwood, spruce, pine, alder, birch, beech, oak and mixtures thereof.

Additionally or alternatively, wood fibres are provided. Preferably, the wood fibres may comprise one or more kinds of wood fibres.

Accordingly, the wood fibres may comprise one kind of wood fibres. Alternatively, the wood fibres may comprise a mixture of two or more kinds of wood fibres. For example, the wood fibres may comprise a mixture of two or three kinds of wood fibres. Preferably, the wood fibres comprise one kind of wood fibres.

Furthermore, the wood fibres may be in the form of separate wood fibres or wood fibre bundles.

It is appreciated that wood fibres according to the present invention are not restricted to specific wood fibres as long as they are suitable for the preparation of wood-based boards.

The term "wood" fibres in the meaning of the present invention refers to the common definition, i.e. wood is the fibrous, hard substance making up most of the tree trunk and branches of softwood and hardwood tree species.

For example, the wood fibres preferably originate from primary wood sources such as softwood tree species, hardwood tree species, non-wood fibre plants and mixtures thereof. Additionally or alternatively, the wood fibres originate from secondary wood sources such as recycled wood.

It is appreciated that the wood fibres have a specific size. Preferably, the wood fibres in an amount of
i) 0 to 20 wt.-%, based on the total amount of dry wood fibres, are of a size which is fractioned at a mesh sieve width of 0.05 mm,
ii) 50 to 90 wt.-%, based on the total amount of dry wood fibres, are of a size which is fractioned at a mesh sieve width of 1.0 mm, and
iii) 70 to 100 wt.-%, based on the total amount of dry wood fibres, are of a size which is fractioned at a mesh sieve width of 3.0 mm.

The size of the wood fibres may be measured with any suitable device for particle separation, particle fractionation and particle size analysis. For example, the measurement may be carried out by sieve analysis using an air jet sieve device. An air jet sieve device measures the size of particles by applying an air flow to the particles being placed in a sieve by a rotating slit nozzle located underneath the sieve. The particles are thus separated from each other and subjected to a fractioning by air dispersing and simultaneous suction of the particles through the sieve over a certain time period. The balance between the amount of particles before being placed in the sieve and after fractioning is considered as the through fraction in gram. Depending on the number of the chosen sieve mesh widths, the fractioning is repeated starting with the smallest sieve mesh widths to the largest sieve mesh width. Thus, for each sieve mesh width the percentage of the total amount of the particles which is fractionized can be calculated. A suitable device is Alpine e 200 LS of HOSOKAWA ALPINE AG, Germany.

Specific examples of wood fibres include pine, fir, spruce, western hemlock, aspen, eucalyptus, cypress, poplar, cedar, beech, oak, birch, maple, bamboo, cereal fibres, algae fibres, seed fibres, fruit fibres and mixtures thereof.

It is appreciated that the wood particles may be also in the form of wood chips. Preferably, wood particles in the form of wood chips may comprise one or more kinds of wood chips.

Accordingly, wood particles in the form of wood chips may comprise one kind of wood chips. Alternatively, wood particles in the form of wood chips may comprise a mixture of two or more kinds of wood chips. For example, wood particles in the form of wood chips may comprise a mixture of two or three kinds of wood chips. Preferably, wood particles in the form of wood chips comprise one kind of wood chips.

It is appreciated that wood chips according to the present invention are not restricted to specific wood chips as long as they are suitable for the preparation of wood-based boards.

If the wood particles are in the form of wood chips, the wood chips may have a specific size. Preferably, the wood chips have a particle length in the range from 1 to 100 mm, more preferably from 2 to 75 mm and most preferably from 3 to 50 mm.

It is appreciated that the particle "length" refers to the longest dimension of the wood chips.

Specific examples of wood chips include pine, fir, spruce, western hemlock, aspen, eucalyptus, cypress, poplar, cedar, beech, oak, birch, maple, bamboo, cereal fibres, algae fibres, seed fibres, fruit fibres and mixtures thereof.

In one embodiment, wood particles or wood fibres are provided.

Alternatively, a mixture of wood particles and wood fibres is provided. In this case the ratio of wood particles to wood fibres may vary within a broad range. For example, the mixture comprises a ratio of wood particles to wood fibres [particles:fibres] in a range from 100:1 to 1:100, preferably from 50:1 to 1:50 and most preferably from 20:1 to 1:20.

The wood particles and/or fibres are provided in dry form or in form of an aqueous suspension.

The term "dry form" with regard to the wood particles and/or fibres provided in step a) refers to wood particles and/or fibres having a moisture content of about 10.0 wt.-% or less, e.g. from 4 to 8 wt.-%, based on the total weight of the wood particles and/or fibres. It is appreciated that higher moisture contents are not preferred as it may be critical during pre-pressing step d) and especially during hot pressing step f).

Thus, the wood particles and/or fibres may optionally by pre-dried to reduce their moisture content in case the moisture content is >10.0 wt.-%, based on the total weight of the wood particles and/or fibres. The optional pre-drying of the wood particles and/or fibres to the desired level is preferably carried out in a pre-dryer such as a tube dryer. Tube dryer such as single-stage or multiple-stage tube dryer are well known in the art and are widely used for drying wood particles and/or fibres in the manufacturing of wood-based boards. The wood particles and/or fibres can be dried for a time period and/or at a temperature sufficient to reduce the moisture content of the wood particles and/or fibres to the desired level. The drying time and/or temperature may be adjusted according to the temperature and the moisture content of the wood particles and/or fibres.

Thus, it is appreciated that the wood particles and/or fibres are preferably provided in dry form in the present process for manufacturing a decorative wood-based board.

Alternatively, the wood particles and/or fibres are provided in the form of an aqueous suspension.

The aqueous suspension of wood particles and/or fibres may be formed by suspending the wood particles and/or fibres provided in dry form, i.e. as obtained after the pre-dryer, in water or by diluting the wood particles and/or fibres obtained after the refiner to the desired wood particle and/or fibre and/or chip content.

If the wood particles and/or fibres are provided in form of an aqueous suspension, the aqueous suspension preferably comprises the wood particles and/or fibres in an amount from 1.0 to 80.0 wt.-%, based on the total weight of the aqueous suspension. More preferably, the aqueous suspension comprises the wood particles and/or fibres in an amount from 5.0 to 75.0 wt.-%, more preferably from 10.0 to 70.0 wt.-% and most preferably from 15.0 to 60.0 wt.-%, based on the total weight of the aqueous suspension.

In one embodiment, the wood particles and/or fibres of step a) are combined simultaneously or separately in any order with at least one base binder and/or at least one additive. Thus, the at least one base binder and/or at least one additive may be added simultaneously or separately in any order to the wood particles and/or fibres, in a manner known by the skilled person.

For example, the wood particles and/or fibres of step a) are combined separately in any order with at least one base binder and/or at least one additive. Alternatively, the wood particles and/or fibres of step a) are combined simultaneously with at least one base binder and/or at least one additive. If the wood particles and/or fibres of step a) are combined simultaneously with at least one base binder and/or at least one additive, the at least one base binder and/or at least one additive is preferably provided as mixture, i.e. the at least one base binder and/or at least one additive may be pre-mixed prior to addition to said wood particles and/or fibres.

The term "at least one" base binder in the meaning of the present invention means that the base binder comprises, preferably consists of, one or more base binder.

In one embodiment of the present invention, the at least one base binder comprises, preferably consists of, one base binder. Alternatively, the at least one base binder comprises, preferably consists of, two or more base binder. For example, the at least one base binder comprises, preferably consists of, two or three base binder. Preferably, the at least one base binder comprises, preferably consists of, one base binder.

For example, the at least one base binder may be present in an amount from 0.01 to 25.0 parts by weight (d/d), based on the total dry weight of the wood particles and/or fibres of step a).

The at least one base binder may be one or more binder which is/are well known to the skilled person and typically used in the base material of wood-based boards. For example, the at least one base binder is selected from the group comprising phenol-formaldehyde resin (PF), urea-formaldehyde resin (UF), melamine-formaldehyde resin (MF), melamine-urea-formaldehyde resin (MUF), urea-melamine-formaldehyde resin (UMF), urea-melamine-phenol-formaldehyde resin (UMPF), epoxy resin, methylene diphenyl diisocyanate resin (MDI), polyurethane resin (PU), resorcinol resin, starch or carboxymethylcellulose and mixtures thereof. Preferably, the at least one base binder is selected from the group comprising phenol-formaldehyde resin (PF), urea-formaldehyde resin (UF), melamine-formaldehyde resin (MF), melamine-urea-formaldehyde resin (MUF), urea-melamine-formaldehyde resin (UMF), urea-melamine-phenol-formaldehyde resin (UMPF), epoxy resin, methylene diphenyl diisocyanate resin (MDI), polyurethane resin (PU) and mixtures thereof. Most preferably, the at least one base binder is urea-formaldehyde resin (UF).

Additionally or alternatively, the at least one additive may be present in an amount from 0.01 to 10.0 parts by weight (d/d), based on the total dry weight of the wood particles and/or fibres of step a). The amount of the at least one additive to be optionally included can be determined in accordance with standard practice and with the desired properties of the final decorative wood-based board.

The term "at least one" additive in the meaning of the present invention means that the additive comprises, preferably consists of, one or more additives.

In one embodiment of the present invention, the at least one additive comprises, preferably consists of, one additive. Alternatively, the at least one additive comprises, preferably consists of, two or more additives. For example, the at least one additive comprises, preferably consists of, two or three additives. Preferably, the at least one additive comprises, preferably consists of, two or more additives.

The at least one additive may be one or more additive which is/are well known to the skilled person and typically used in wood-based boards. For example, the at least one additive is selected from the group comprising waxes, colourants, filler, dispersants, biocides, hardener, flame retardants and mixtures thereof. Preferably, the at least one additive is selected from waxes, hardener and mixtures thereof. More preferably, the at least one additive comprises, most preferably consists of, waxes and hardener.

The combining (or mixing) of the wood particles and/or fibres of step a) with at least one base binder and/or at least one additive can be accomplished by any conventional means known to the skilled person. The skilled person will adapt the combining (or mixing) conditions such as the mixing speed and temperature according to his process equipment. Additionally, the combining (or mixing) may be carried out under homogenizing and/or particle dividing conditions.

Characterization of step b): provision of at least one inorganic particulate filler material and at least one binder According to step b) of the present invention, at least one dry or liquid coating composition comprising at least one inorganic particulate filler material and at least one binder is provided.

Thus, it is one requirement of the present invention that at least one dry or liquid coating composition comprising at least one inorganic particulate filler material and at least one binder is provided.

The term "at least one" inorganic particulate filler material in the meaning of the present invention means that the inorganic particulate filler material comprises, preferably consists of, one or more inorganic particulate filler materials.

In one embodiment of the present invention, the at least one inorganic particulate filler material comprises, preferably consists of, one inorganic particulate filler material. Alternatively, the at least one inorganic particulate filler material comprises, preferably consists of, two or more inorganic particulate filler materials. For example, the at least one inorganic particulate filler material comprises, preferably consists of, two or three inorganic particulate filler materials. Preferably, the at least one inorganic particulate filler material comprises, preferably consists of, one inorganic particulate filler material.

For example, the at least one inorganic particulate filler material is selected from the group consisting of dolomite, ground calcium carbonate (GCC), precipitated calcium carbonate (PCC), modified calcium carbonate (MCC), magnesium hydroxide, talc, gypsum, titanium dioxide, kaolin, silicate, mica, barium sulphate, calcined clay, non-calcined (hydrous) clay, bentonite, inorganic pigments and mixtures thereof.

"Dolomite" in the meaning of the present invention is a carbonatic calcium-magnesium-mineral having the chemical composition of CaMg(CO3)2 ("CaCO3.MgCO3"). Dolomite mineral contains at least 30.0 wt.-% MgCO3, based on the total weight of dolomite, preferably more than 35.0 wt.-%, more than 40.0 wt.-%, typically from 45.0 to 46.0 wt.-% MgCO3.

"Ground calcium carbonate" (GCC) in the meaning of the present invention is a calcium carbonate obtained from natural sources, such as limestone, marble or chalk, and processed through a wet and/or dry treatment such as grinding, screening and/or fractionating, for example by a cyclone or classifier.

According to one embodiment of the present invention the GCC is obtained by dry grinding. According to another embodiment of the present invention the GCC is obtained by wet grinding and subsequent drying.

In general, the grinding step can be carried out with any conventional grinding device, for example, under conditions such that refinement predominantly results from impacts with a secondary body, i.e. in one or more of: a ball mill, a rod mill, a vibrating mill, a roll crusher, a centrifugal impact mill, a vertical bead mill, an attrition mill, a pin mill, a hammer mill, a pulveriser, a shredder, a de-clumper, a knife cutter, or other such equipment known to the skilled man. In case calcium carbonate-containing material comprises a wet ground calcium carbonate-containing material, the grinding step may be performed under conditions such that autogenous grinding takes place and/or by horizontal ball milling, and/or other such processes known to the skilled man. The wet processed ground calcium carbonate-containing material thus obtained may be washed and dewatered by well-known processes, e.g. by flocculation, filtration or forced evaporation prior to drying. The subsequent step of drying may be carried out in a single step such as spray drying, or in at least two steps. It is also common that such a calcium carbonate material undergoes a beneficiation step (such as a flotation, bleaching or magnetic separation step) to remove impurities.

In one embodiment of the present invention, the GCC is selected from the group comprising marble, chalk, limestone and mixtures thereof.

"Precipitated calcium carbonate" (PCC) in the meaning of the present invention is a synthesized material, generally obtained by precipitation following reaction of carbon dioxide and lime in an aqueous environment or by precipitation of a calcium and carbonate ion source in water. PCC may be one or more of the aragonitic, vateritic and calcitic mineralogical crystal forms. Preferably, PCC is one of the aragonitic, vateritic and calcitic mineralogical crystal forms.

Aragonite is commonly in the acicular form, whereas vaterite belongs to the hexagonal crystal system. Calcite can form scalenohedral, prismatic, spheral and rhombohedral forms. PCC can be produced in different ways, e.g. by precipitation with carbon dioxide, the lime soda process, or the Solvay process in which PCC is a by-product of ammonia production. The obtained PCC slurry can be mechanically dewatered and dried.

"Modified calcium carbonate" (MCC) in the meaning of the present invention may feature a natural ground or precipitated calcium carbonate with an internal structure modification or a surface-reaction product, i.e. "surface-reacted calcium carbonate". A "surface-reacted calcium carbonate" is a material comprising calcium carbonate and water-insoluble, preferably at least partially crystalline, calcium salts of anions of acids on the surface. Preferably, the insoluble calcium salt extends from the surface of at least a part of the calcium carbonate. The calcium ions forming said at least partially crystalline calcium salt of said anion originate largely from the starting calcium carbonate material. MCCs are described, for example, in US 2012/0031576 A1, WO 2009/074492 A1, EP 2 264 109 A1, WO 00/39222 A1, or EP 2 264 108 A1.

It is preferred that the at least one inorganic particulate filler material comprises at least one ground calcium carbonate (GCC) or at least one modified calcium carbonate (MCC). Preferably, the at least one ground calcium carbonate (GCC) is selected from the group comprising marble, chalk, limestone and mixtures thereof, and more preferably from marble or chalk.

It is preferred that the at least one inorganic particulate filler material is at least one inorganic particulate calcium carbonate-containing material. In addition to calcium carbonate, the at least one inorganic particulate calcium carbonate-containing material may further comprise metal oxides such as titanium dioxide and/or aluminium trioxide, metal hydroxides such as aluminium tri-hydroxide, metal salts such as sulphates, silicates such as talc and/or kaolin clay and/or mica, carbonates such as magnesium carbonate and/or gypsum, satin white and mixtures thereof.

According to one embodiment of the present invention, the amount of calcium carbonate in the at least one inorganic particulate calcium carbonate-containing material is of ≥10.0 wt.-%, preferably of ≥20.0 wt.-%, based on the total dry weight of the at least one inorganic particulate calcium carbonate-containing material. Preferably, the amount of calcium carbonate in the at least one inorganic particulate calcium carbonate-containing material is of ≥50.0 wt.-%, even more preferably of ≥90.0 wt.-%, more preferably of ≥95.0 wt.-% and most preferably of ≥97.0 wt.-%, based on the total dry weight of the at least one inorganic particulate calcium carbonate-containing material.

Preferably, the at least one inorganic particulate filler material of step b) has specific dimensions. For example, the at least one inorganic particulate filler material has a median particle size d50 from 0.1 to 150.0 µm. In one embodiment of the present invention, the at least one inorganic particulate filler material has a median particle size d50 from 0.2 µm to 100.0 µm, more preferably from 0.3 µm to 50.0 µm and most preferably from 0.5 µm to 3.0 µm.

The at least one inorganic particulate filler material may have a top cut, for example, of below 150.0 µm. The term "top cut" (or top size), as used herein, means the particle size value wherein at least 98.0% of the material particles are less than that size. Preferably, the at least one inorganic particulate filler material has a top cut of below 140.0 µm and more preferably of below 120.0 µm.

In one embodiment, the at least one inorganic particulate filler material has
   i) a particle size $d_{98}$ of <500 µm,
   ii) a particle size $d_{80}$ of 0.1 to 250 µm, iii) a median particle size $d_{50}$ of 0.1 to 150 µm, and iv) a particle size $d_{20}$ of 0.1 to 50 µm.

Additionally or alternatively, the at least one inorganic particulate filler material has a ratio of particle size $d_{80}$ to particle size $d_{20}$ $[d_{80}/d_{20}]$ from 0.5 to 1.0.

Preferably, the at least one inorganic particulate filler material has i) a particle size $d_{98}$ of <500 µm, ii) a particle size $d_{80}$ of 0.1 to 250 µm, iii) a median particle size $d_{50}$ of 0.1 to 150 µm, iv) a particle size $d_{20}$ of 0.1 to 50 µm, and v) a ratio of particle size $d_{80}$ to particle size $d_{20}$ $[d_{80}/d_{20}]$ from 0.5 to 1.0.

In one embodiment, the at least one inorganic particulate filler material has a specific surface area of from 0.5 to 200.0 m2/g, more preferably of from 0.5 to 100.0 m2/g and most preferably of from 0.5 to 75.0 m2/g as measured by the BET nitrogen method.

The term "specific surface area" (in m2/g) of the at least one inorganic particulate calcium carbonate-containing material in the meaning of the present invention is determined using the BET method, which is well known to the skilled man (ISO 9277:2010).

The term "at least one" binder in the meaning of the present invention means that the binder comprises, preferably consists of, one or more binder.

In one embodiment of the present invention, the at least one binder comprises, preferably consists of, one binder. Alternatively, the at least one binder comprises, preferably consists of, two or more binder. For example, the at least one binder comprises, preferably consists of, two or three binder. Preferably, the at least one binder comprises, preferably consists of, two binder.

It is appreciated that the binder of step b) and the optional base binder of step a) may be the same or different. For example, the binder of step b) and the optional base binder of step a) are the same. Alternatively, the binder of step b) and the optional base binder of step a) are different.

Preferably, the binder of step b) and the optional base binder of step a) are different.

The at least one binder may be one or more binder which is/are well known to the skilled person and typically used in coatings of wood-based boards. In one embodiment, the at least one binder of step b) is selected from the group consisting of alkyd resin, epoxy resin, epoxy ester resin, poly(vinyl alcohol), poly(vinyl pyrrolidone), poly(vinyl acetate), poly(oxazolines), poly(vinylacetamides), partially hydrolyzed poly(vinyl acetate/vinyl alcohol), poly((meth)acrylic acid), poly((meth)acrylamide), poly(alkylene oxide), polyether, saturated polyester, sulfonated or phosphated polyesters and polystyrenes, poly(styrene-co-(meth)acrylate), poly(styrene-co-butadiene), polyurethane latex, poly(n-butyl (meth)acrylate), poly(2-ethylhexyl (meth)acrylate), copolymers of (meth)acrylates, such as n-butyl(meth)acrylate and ethyl(meth)acrylate, copolymers of vinylacetate and n-butyl(meth)acrylate casein, copolymers of polyvinylchloride, gelatin, cellulose ethers, zein, albumin, chitin, chitosan, dextran, pectin, collagen derivatives, collodian, agar-agar, arrowroot, guar, carrageenan, starch, tragacanth, xanthan, or rhamsan and mixtures thereof. Preferably, the at least one binder of step b) is selected from the group consisting of alkyd resin, epoxy resin, epoxy ester resin, poly(vinyl alcohol), poly(vinyl pyrrolidone), poly(vinyl acetate), poly(oxazolines), poly(vinylacetamides), partially hydrolyzed poly(vinyl acetate/vinyl alcohol), poly((meth)acrylic acid), poly((meth)acrylamide), poly(alkylene oxide), polyether, saturated polyester, sulfonated or phosphated polyesters and polystyrenes, poly(styrene-co-(meth)acrylate), poly(styrene-co-butadiene), polyurethane latex, poly(n-butyl (meth)acrylate), poly(2-ethylhexyl (meth)acrylate), copolymers of (meth)acrylates, such as n-butyl(meth)acrylate and ethyl (meth)acrylate, copolymers of vinylacetate and n-butyl (meth)acrylate casein, copolymers of polyvinylchloride, starch and mixtures thereof. More preferably, the at least one binder of step b) is selected from the group consisting poly(vinyl alcohol), poly(vinyl pyrrolidone), poly(vinyl acetate), poly(oxazolines), poly(vinylacetamides), partially hydrolyzed poly(vinyl acetate/vinyl alcohol), starch and mixtures thereof. Most preferably, the at least one binder of step b) is a mixture of poly(vinyl alcohol) and starch.

The term "at least one" dry or liquid coating composition in the meaning of the present invention means that the dry or liquid coating composition comprises, preferably consists of, one or more dry or liquid coating compositions.

In this context, it is contemplated to possibly use different separate coating compositions. For example, the process may be carried out with two different coating compositions that are applied simultaneously or consecutively. Thus, it is to be understood that the expression "one or more coating compositions" refers to the provision and use of different separate coating compositions. However, it is appreciated that this does not exclude the possibility of the use of, for example, two different coating compositions that are combined prior to their provision in step b) to one coating composition at least comprising two inorganic particulate filler materials and two binder.

In one embodiment of the present invention, the at least one dry or liquid coating composition comprises, preferably consists of, one dry or liquid coating composition. Alternatively, the at least one dry or liquid coating composition comprises, preferably consists of, two or more dry or liquid coating compositions. For example, the at least one dry or liquid coating composition, preferably consists of, two or three dry or liquid coating compositions. The at least one dry or liquid coating composition preferably comprises, preferably consists of, one dry or liquid coating composition.

It is appreciated that the at least one dry or liquid coating composition preferably comprises the at least one inorganic particulate filler material and at least one binder in specific amounts.

For example, the at least one dry or liquid coating composition of step b) comprises the at least one inorganic particulate filler material in an amount from 60 to 98 wt.-%, preferably 70 to 98 wt.-%, most preferably 80 to 98 wt.-% based on the total dry weight of the at least one coating composition, and the at least one binder in an amount from 2 to 40 wt.-%, preferably 2 to 30 wt.-%, most preferably 2 to 20 wt.-%, based on the total dry weight of the at least one coating composition.

Thus, the at least one dry or liquid coating composition of step b) comprises the at least one inorganic particulate filler material in an amount from 60 to 98 wt.-% and the at least one binder in an amount from 2 to 40 wt.-%. More preferably, the at least one dry or liquid coating composition preferably comprises the at least one inorganic particulate filler material in an amount from 70 to 98 wt.-% and the at least one binder in an amount from 2 to 30 wt.-%. Most preferably, the at least one dry or liquid coating composition comprises the at least one inorganic particulate filler material in an amount from 80 to 98 wt.-% and the at least one binder in an amount from 2 to 20 wt.-%. The amounts are based on the total dry weight of the at least one coating composition and refer to the dry weight of the at least one inorganic filler material and to the dry weight of the at least one binder.

The term "dry" with regard to the at least one inorganic particulate filler material and the at least one binder is understood to be a material having less than 0.3% by weight of water relative to the weight of the at least one inorganic particulate filler material and the at least one binder. The % water content is determined according to the Coulometric Karl Fischer measurement method, wherein the at least one inorganic particulate filler material and the at least one binder is heated to 220° C., and the water content released as vapour and isolated using a stream of nitrogen gas (at 100 ml/min) is determined in a Coulometric Karl Fischer unit.

The at least one inorganic particulate filler material and at least one binder are provided in form of at least one dry or liquid coating composition in step b).

For the purposes of the present invention, the term "coating composition" refers to a composition which is applied on the surface of a pre-pressed wood-based mat and which remains predominantly on the surface of the hot-pressed wood-based board.

The term "dry" with regard to the coating composition is understood to be a composition having less than 0.3% by weight of water relative to the weight of the coating composition. The % water content is determined according to the Coulometric Karl Fischer measurement method, wherein the coating composition is heated to 220° C., and the water content released as vapour and isolated using a stream of nitrogen gas (at 100 ml/min) is determined in a Coulometric Karl Fischer unit.

The term "liquid" with regard to the coating composition is understood to be a composition that is liquid under standard ambient temperature and pressure (SATP) which refers to a temperature of 298.15 K (25° C.) and an absolute pressure of exactly 100 000 Pa (1 bar, 14.5 psi, 0.98692 atm). The liquid is preferably a suspension (or dispersion).

If at least one dry coating composition is provided in step b), it is appreciated that the at least one inorganic particulate filler material as well as the at least one binder are preferably combined in dry form for obtaining the at least one dry coating composition.

If at least one liquid coating composition is provided in step b), the at least one inorganic particulate filler material and/or the at least one binder is/are in form of an aqueous suspension. Preferably, the at least one inorganic particulate filler material and the at least one binder is in form of an aqueous suspension. More preferably, the at least one inorganic particulate filler material is in form of an aqueous suspension. For forming the at least one liquid coating composition of step b), the at least one binder, such as in dry form, is preferably mixed into the at least one inorganic particulate filler material provided in form of an aqueous suspension.

In view of this, the at least one inorganic particulate filler material can be provided in powder form, i.e. in dry form. The term "dry" with regard to the at least one inorganic particulate filler material is understood to be a material having less than 0.3% by weight of water relative to the weight of the at least one inorganic particulate filler material.

If the at least one inorganic particulate filler material is provided in form of an aqueous suspension, the aqueous suspension preferably comprises the at least one inorganic particulate filler material in an amount from 1.0 to 80.0 wt.-%, based on the total weight of the aqueous suspension. More preferably, the aqueous suspension comprises the at least one inorganic particulate filler material in an amount from 30.0 to 78.0 wt.-%, more preferably from 40.0 to 78.0 wt.-% and most preferably from 45.0 to 78.0 wt.-%, based on the total weight of the aqueous suspension.

The at least one dry or liquid coating composition may further comprise at least one compound which is well known to the skilled person and typically used in coatings of wood-based boards.

The term "at least one" compound in the meaning of the present invention means that the compound comprises, preferably consists of, one or more compound(s).

In one embodiment of the present invention, the at least one compound comprises, preferably consists of, one compound. Alternatively, the at least one compound comprises, preferably consists of, two or more compounds. For example, the at least one compound comprises, preferably consists of, two or three compounds. Preferably, the at least one compound comprises, preferably consists of, two or more compounds and thus is a mixture of compounds. For example, the at least one dry or liquid coating composition of step b) further comprises at least one compound selected from the group comprising matting agents, coalescent agents or film forming agents, anti-foaming agents, dispersants, rheology agents, cross-linking agents, biocides, light stabilizer, preserving agents, hardener, flame retardants, release agents containing waxes or fats, and mixtures thereof.

If the at least one coating composition comprises the at least one compound, the at least one liquid coating composition of step b) is preferably formed in that the at least one inorganic particulate filler material, preferably in dry form, is mixed into an aqueous suspension or solution of the at least one compound selected from the group comprising matting agents, coalescing agents or film forming agents, anti-foaming agents, dispersants, rheology agents, cross-linking agents, biocides, light stabilizer, preserving agents, hardener, flame retardants, release agents containing waxes or fats, and mixtures thereof. Then, the at least one binder, preferably in dry form, is dispersed into the suspension of the at least one inorganic particulate filler material and the at least one compound.

Thus, in one embodiment, the at least one dry or liquid coating composition comprises, preferably consists of, at least one inorganic particulate filler material, at least one binder and at least one compound selected from the group comprising matting agents, coalescing agents or film forming agents, anti-foaming agents, dispersants, rheology agents, cross-linking agents, biocides, light stabilizer, preserving agents, hardener, flame retardants, release agents containing waxes or fats, and mixtures thereof, and optionally water.

Alternatively, the at least one dry or liquid coating composition consists of the at least one inorganic particulate filler material and the at least one binder, and optionally water.

If the at least one dry or liquid coating composition further comprises at least one compound selected from the group comprising matting agents, coalescing agents or film forming agents, anti-foaming agents, dispersants, rheology agents, cross-linking agents, biocides, light stabilizer, preserving agents, hardener, flame retardants, release agents containing waxes or fats, and mixtures thereof, the at least one dry or liquid coating composition preferably comprises the at least one compound in an amount from 2.0 to 8.0 wt.-%, e.g. from 3.0 to 7.0 wt.-%, based on the total dry weight of the at least one coating composition.

Characterization of step c): forming a wood-based mat

According to step c) of the present invention, a wood-based mat having a first side and a reverse side is formed from the wood particles and/or fibres provided in step a).

It is appreciated that the term "wood-based mat formed from the wood particles and/or fibres" refers to a mixture of the wood particles and/or fibres and the optional at least one base binder and/or at least one additive which is used for forming the base of the final decorative wood-based board.

The mixture of wood particles and/or fibres and the optional at least one base binder and/or at least one additive is laid into an even and consistent mat. This may be accomplished in batch mode or by continuous formation, preferably continuous formation.

The forming step c) may be undertaken by all the techniques and methods well known to the man skilled in the art for forming a mat from wood particles and/or fibres and optional at least one base binder and/or at least one additive. The forming step c) may be carried out with any conventional forming machine, for example, under conditions such that a continuous wood-based mat is obtained or other such equipment known to the skilled person. For example, wood particles and/or fibres and optional at least one base binder and/or at least one additive is spread by hand or the back and forth movement of a tray or hopper feeder or air separation for forming the wood-based mat.

If the decorative wood-based board is manufactured in a wet process, the wood-based mat is preferably subjected to a step of reducing the water content of the mat. Such drying can be carried out before or during or after, preferably during, process step c). Such drying may be undertaken by all the techniques and methods well known to the man skilled in the art for reducing the water content of a wood-based mat. The drying may be carried out with any conventional method, e.g. by mechanically applied pressure, hot air, vacuum, force of gravity or suction power such that a wood-based mat having a water content that is reduced compared to the water content before the drying is obtained or other such equipment known to the skilled person. Preferably, the drying is carried out by mechanically applied pressure such as a dewatering drum, followed by a treatment with hot air.

It is appreciated that a single or multi-layer wood-based mat can be formed in step c), preferably a multi-layer wood-based mat is formed in step c).

In one embodiment, the multi-layer wood-based mat is formed in multiple forming steps. For example, a three-layer wood-based mat is formed in three forming steps.

The wood-based mat obtained in forming step c) has a first side and a reverse side.

Characterization of step d): pre-pressing the wood-based mat

According to step d) of the present invention, the wood-based mat of step c) is pre-pressed into a pre-pressed wood-based mat.

Thus, the wood-based mat obtained in step c) is pre-pressed prior to applying the at least one dry or liquid coating composition of step b) and hot pressing.

The pre-pressing may be carried out by all the techniques and methods well known to the man skilled in the art for pre-pressing wood-based mats into a pre-pressed wood-based mat. The pre-pressing may be carried out with any conventional pressing machine, e.g. single-opening presses, multi-opening batch presses or continuous presses, under conditions such that a pre-pressed wood-based mat is obtained or other such equipment known to the skilled person.

It is appreciated that the pre-pressing temperature, optional pressure, and time will vary according to the decorative wood-based board to be produced. The pre-pressing is preferably carried out at ambient temperature. Thus, the pre-pressing is preferably carried out at a temperature ranging from 10 to 60° C., more preferably from 15 to 30° C. and most preferably from 15 to 25° C. Additionally or alternatively, the pre-pressing is carried out at a pressure ranging from 5 to 40 bar and preferably from 8 to 35 bar.

Thus, the pre-pressing is preferably carried out at ambient temperature or a pressure ranging from 5 to 40 bar and preferably from 8 to 35 bar. Alternatively, the pre-pressing is carried out at ambient temperature and a pressure ranging from 5 to 40 bar and preferably from 8 to 35 bar.

Preferably, the pre-pressing is carried out at a temperature ranging from 10 to 60° C., more preferably from 15 to 30° C. and most preferably from 15 to 25° C. and a pressure ranging from 5 to 40 bar and preferably from 8 to 35 bar.

Characterization of step e): applying at least one layer of the at least one dry or liquid coating composition on the pre-pressed wood-based mat According to step e) of the present invention, at least one layer of the at least one dry or liquid coating composition of step b) is applied on the first and/or reverse side of the pre-pressed wood-based mat obtained in step d).

It is decisive for the process of the present invention that the step of applying at least one layer of the at least one dry or liquid coating composition of step b) on the first and/or reverse side of the wood-based mat is carried out after the pre-pressing step but before the hot pressing step. The inventors surprisingly found out that this order of steps leads to wood-based boards having excellent surface characteristics without implementing further processing steps to prepare the boards' surface. In particular, a wood-based board is obtained, wherein the wood-based board has improved surface characteristics, and especially improved optical characteristics and an increased surface density. Furthermore, wood-based boards having improved mechanical properties can be obtained.

The term "at least one" layer of the at least one dry or liquid coating composition in the meaning of the present invention means that step e) comprises applying one or more layer(s) of the at least one dry or liquid coating composition on the first and/or reverse side of the pre-pressed wood-based mat obtained in step d).

In one embodiment of the present invention, step e) comprises applying one layer of the at least one dry or liquid coating composition. Alternatively, step e) comprises applying two or more layers of the at least one dry or liquid coating composition. For example, step e) of the present invention may comprise applying two or three layers of the at least one dry or liquid coating composition. Preferably, step e) comprises applying one layer of the at least one dry or liquid coating composition.

It is appreciated that in case two or more dry or liquid coating compositions are provided in step b) each dry or liquid coating composition may be applied in form of one or more layers as described above. According to one embodiment, coating step e) is carried out one or more times using two or more different coating compositions.

The at least one layer of the at least one coating composition may be applied in dry or liquid form. According to one embodiment, the at least one layer of the at least one coating composition of the inventive process is applied in step e) in dry form. According to another embodiment, the at least one layer of the at least one coating composition of the inventive process is applied in step e) in liquid form. In this case, the inventive process may further comprise a step e1) of drying the at least one coating layer. Preferably, the at least one layer of the at least one coating composition of the inventive process is applied in step e) in liquid form.

It is one requirement that the at least one layer of the at least one dry or liquid coating composition of step b) is applied at least on the first side or reverse side of the pre-pressed wood-based mat. Thus, according to one embodiment, the at least one layer of the at least one dry or liquid coating composition of step b) is applied on the first side of the pre-pressed wood-based mat. According to another embodiment, the at least one layer of the at least one dry or liquid coating composition of step b) is applied on the reverse side of the pre-pressed wood-based mat.

According to one embodiment, process step e) is carried out on the first and reverse side of the pre-pressed wood-based mat to manufacture a wood-based board being coated on the first and the reverse side. This step may be carried out for each side separately or may be carried out on the first and the reverse side simultaneously, preferably separately.

According to another embodiment, wherein the at least one layer of the at least one coating composition is in liquid form, process step e), and optionally step e1), is carried out on both sides of the pre-pressed wood-based mat to manufacture a wood-based board being coated on the first and the reverse side. These steps may be carried out for each side separately or may be carried out on the first and the reverse side simultaneously.

The at least one coating layer may be applied onto the pre-pressed wood-based mat by conventional coating means commonly used in this art. Suitable coating methods are, e.g., metering size press, curtain coating, spray coating, roller coating and the like. Some of these methods allow for simultaneous coatings of two or more layers, which is preferred from a manufacturing economic perspective. However, any other coating method which would be suitable to form a coating layer on the pre-pressed wood-based mat may also be used.

In an exemplary embodiment the at least one layer of the at least one coating composition is applied by metering size press, curtain coating or spray coating. In a preferred embodiment, spray coating is used to apply the at least one coating layer. In another preferred method, curtain coating is used to apply the at least one coating layer.

According to an exemplary embodiment, the at least one layer of the at least one liquid coating composition is applied by metering size press, curtain coating or spray coating, preferably curtain coating. According to another exemplary embodiment, a dry coating composition is applied by spreading or electrostatic powder coating.

It is appreciated that process step e) may be carried out in a batch or continuous process. If process step e) is carried out in a continuous process, the at least one layer of the at least one dry or liquid coating composition of step b) is preferably applied on the first side of the pre-pressed wood-based mat obtained in step d) only.

According to one embodiment of the present invention, the at least one liquid coating composition used to form the at least one coating layer has a solid content from 10 to 80 wt.-%, preferably from 30 to 75 wt.-%, most preferably from 40 to 70 wt.-%, based on the total weight of the at least one liquid coating composition.

The at least one liquid coating composition can have a Brookfield viscosity in the range from 20 to 3 000 mPa·s, preferably from 100 to 3 000 mPa·s, more preferably from 150 to 2 500 mPa·s and most preferably from 200 to 1 000 mPa·s.

The at least one layer of the at least one coating composition is preferably applied in specific amounts. According to one embodiment, the at least one layer of the at least one coating composition is applied in an amount from 1 to 1 000 g/m2, preferably in an amount from 10 to 500 g/m2, more preferably in an amount from 50 to 300 g/m2, and most preferably in an amount from 10 to 200 g/m2, based on the dry weight of the at least one coating composition.

In order to facilitate the release of the surfaces of the wood-based mat from the hot plates of the pressing machines after hot-pressing of step f), it may be advantageous to further apply a release agent to the first and/or reverse side of the wood-based board. Release agents for the manufacturing of wood-based boards usually contain waxes or fats and are commonly used in the art. Another option is to apply a release paper, i.e. a paper impregnated with release agents, to achieve an improved release of the hot-pressed wood-based board from the pressing plate. The release paper can be removed after the hot-pressing of step f). It is further appreciated that the release agent or the release paper may be applied to the coated and/or uncoated side of the pre-pressed wood-based mat. The release agent and/or the release paper may be applied by conventional application means known to the skilled man.

Thus, according to one embodiment of the present invention, step e) further comprises a step e1) of applying a release agent or a release paper to at least one side of the pre-pressed wood-based.

Characterization of step f): hot pressing the pre-pressed wood-based mat

According to step f) of the present invention, the pre-pressed wood-based mat obtained in step e) is hot pressed into a solid wood-based board.

The hot pressing of step f) may be undertaken by all the techniques and methods well known to the man skilled in the art for hot pressing a pre-pressed wood-based mat into a solid wood-based board. The hot pressing of step f) may be carried out with any conventional pressing machine, e.g. single-opening presses, multi-opening batch presses or continuous presses, under conditions such that a solid wood-based board is obtained or other such equipment known to the skilled person. Preferably, hot pressing step f) is carried out with a continuous press.

For example, heat and optionally pressure, preferably heat and pressure, are applied to the pre-pressed wood-based mat in the hot pressing step such as to join together the wood particles and/or fibres and the optional at least one base binder and/or at least one additive and the at least one coating layer applied on the first and/or reverse side comprising at least one inorganic particulate filler material and at least one binder and the optional at least one compound into a solid wood-based board in pressing step g).

It is appreciated that the hot pressing temperature, optional pressure, and time will vary according to the solid wood-based board to be produced. However, the hot pressing in step f) is preferably carried out at a temperature ranging from 130 to 260° C., more preferably from 160 to 240° C.

In one embodiment, the hot pressing is carried out at a pressing time factor, in relation to board thickness, of 10 to 25 s/mm, preferably of 10 to 20 s/mm and most preferably of 12 to 18 s/mm.

After hot pressing step f), the solid wood-based board may be cooled and/or stacked.

Depending on the further use of the hot-pressed wood-based board, step f) may comprise further steps for surface preparation such as sanding or any other means for surface preparation known in the art for improving surface properties such as roughness, glossiness, abrasiveness etc. For example, if the wood-based board comprises only one coated side that functions as a backing layer or is part of a backing layer, it may be advantageous to prepare the surface of the uncoated side on the opposite side for the subsequent decorative treatment of step g) of the inventive process. The coated side of the wood-based board, in turn, usually does not require further processing steps at this stage independent from its further use in the inventive process. In other words, if the coated side represents the backing layer, this side usually does not require further processing steps such as sanding or levelling to prepare for its further use e.g. bonding to a substrate. Furthermore, if the coated side of the board serves as the basis for the decorative treatment, a surface preparation is usually not necessary to obtain good results for the application of the decorative finishing. However, if desired, the coated side of the surface may as well be further prepared by processing steps common in the art to further improve its surface properties.

Thus, according to one embodiment, step f) comprises step f1) of subjecting the first and/or reverse side of the solid wood-based board obtained in step f) to a further processing step for surface preparation.

In case the at least one coating composition was only applied to the first or the reverse side of the pre-pressed wood-based mat, i.e. the solid wood-based board of step f) comprises only on the first or the reverse side the at least one coating layer, the uncoated side of the solid wood-based board may be subjected to a further processing step such as sanding or the application of a primer to e.g. decrease the surface roughness, and thereby improving the surface properties of the uncoated side of the solid wood-based board for a further process step such as a decorative treatment. Thus, according to one embodiment, step f) of the present invention further comprises step f1) of subjecting the uncoated side of the solid wood-based board, i.e. the side of the wood-based board not comprising the at least one coating layer, to a further processing step for surface preparation.

According to one embodiment, step f) of the present invention may further comprise step f1) subjecting the side of the wood-based board comprising the at least one coating layer to a further processing step for surface preparation.

The solid wood-based board may be a fibre board product, preferably a high-density fibre (HDF) board, medium-density fibre (MDF) board, low-density fibre (LDF) board, a particle board, an oriented strandboard (OSB), a hardboard or an insulation board.

Characterization of step g): applying at least one decorative finishing on the first and/or reverse side of the wood-based board According to step g) of the present invention, at least one decorative finishing is applied on the first and/or reverse side of the wood-based board obtained in step f) by inkjet-printing, by rotogravure printing, by applying a decorative paper, a decorative foil or a liquid coating.

It is one requirement of the present invention, that the at least one decorative finishing of step g) is applied on the first or the reverse side of the wood-based board obtained in step f).

The term "at least one" decorative finishing in the meaning of the present invention means that step g) comprises applying one or more decorative finishing on the first and/or reverse side of the pre-pressed wood-based mat obtained in step d). It is obvious to the skilled person that this includes the possibility to apply one or more decorative finishing of the same category of the above-mentioned methods of inkjet-printing, rotogravure printing etc. or combinations thereof.

In one embodiment of the present invention, step g) comprises applying one decorative finishing. Alternatively, step g) comprises applying two or more decorative finishing. For example, step g) of the present invention may comprise applying two or three decorative finishing. Preferably, step g) comprises applying one decorative finishing.

According to one embodiment, the at least one decorative finishing of step g) is applied on the first side of the wood-based board obtained in step f). According to another embodiment, the at least one decorative finishing of step g) is applied on the reverse side of the wood-based board.

It is also possible to apply the decorative finishing on the first and the reverse side of the wood-based board to manufacture a wood-based board being decorated on the first and the reverse side. According to one embodiment, process step g) is carried out on both sides, i.e. the first and reverse side, of the solid wood-based board obtained in step f). This step may be carried out for each side separately or may be carried out on the first and the reverse side simultaneously, preferably separately.

It is advantageous to carry out the application of the decorative finishing according to the inventive process on the coated side of the wood-based board to improve the final appearance of the decoration finishing such as brightness or print quality.

Thus, according to one embodiment, the at least one decorative finishing of step g) is carried out on the at least one coating layer of the first side of the wood-based board obtained in step f). According to another embodiment, the at least one decorative finishing of step g) is carried out on the at least one coating layer of the reverse side of the wood-based board obtained in step f). According to yet another embodiment, the at least one decorative finishing of step g) is carried out on the at least one coating layer of the first and the reverse side of the wood-based board obtained in step f Preferably, the at least one decorative finishing of step g) is carried out on the at least one coating layer of the first side of the wood-based board obtained in step f).

In case the wood-based board obtained in step f) comprises only one coating layer on the first or the reverse side, the application of the decorative finishing according to the invention can also be carried out on the side of the wood-based board not comprising a coating layer, i.e. on the side opposite to the coating layer on the first or reverse side. According to one embodiment, the decorative finishing of step g) is carried out on the opposite side of the first or reverse side comprising at least one coating layer.

The at least one decorative finishing of step g) may be applied in batch or in continuous mode. According to one embodiment, the at least one decorative finishing of step g) is applied in batch mode. According to one embodiment, the at least one decorative finishing of step g) is applied in continuous mode.

The at least one decorative finishing according to the inventive process can be applied by inkjet-printing, by rotogravure printing, or by applying a decorative paper, a decorative foil or a liquid coating.

According to one embodiment, the at least one decorative finishing of step g) is applied by inkjet-printing. The application of at least one decorative finishing by inkjet-printing in step g) may be carried out with any digital inkjet printing apparatus for direct printing on wood-based boards known to the person skilled in the art, such as inkjet printer Jupiter JPT-L from Hymmen. The inkjet printer may comprise one or several inkjet print head(s). It is appreciated that the inkjet print head(s) may apply the ink to the wood-based board by moving the print head(s) over a stationary wood-based board, or moving a wood-based board with respect to stationary inkjet print head(s), or a combination of both. Furthermore, the inkjet-printing may be carried out in a predefined printing speed, usually measured as length of printed wood-based board per minute. The printing speed of the inkjet-printing according to step g) may be in the range of 1 to 50 m/min, preferably 5 to 40 m/min, more preferably 10 to 35 m/min, and most preferably 15 to 30 m/min.

The inkjet-printing apparatus may be used with water-based ink, organic solvent-based ink, UV-curable ink or any other ink that is suitable for direct printing on wood-based boards. The ink applied in step g) may be dried by any suitable measure for drying ink on a wood-based board such as by application of airflow, hot airflow, infrared radiation or microwave radiation. In case a UV-curable ink is applied, the inkjet printing of step g) may further comprise a step g1) of UV-curing the ink. This step may be carried out by any measure for curing ink by UV radiation known in the art, for example, by a UV mercury vapor lamp or a UV light emitting diode, or a combination of both.

According to one embodiment, the at least one decorative finishing of step g) is applied by rotogravure printing. Such printing may be carried out by any rotogravure printing press for direct printing on solid wood-based boards known to the skilled person. The rotogravure printing press may comprise one or more printing cylinders. The rotogravure printing press may be used with water-based ink, organic solvent-based ink, UV-curable ink or any other ink that is suitable for direct printing on wood-based boards. The ink applied in step g) may be dried by any suitable measure for drying ink on a wood-based board such as by application of airflow, hot airflow, infrared radiation or microwave radiation. In case a UV-curable ink is applied, the inkjet printing of step g) may further comprise a step g1) of UV-curing the ink. This step may be carried out by any measure for curing ink by UV radiation known in the art, for example, by a UV mercury vapor lamp or a UV light emitting diode, or a combination of both.

The inventors surprisingly found that direct printing by e.g. inkjet printing on a side of the wood-based board comprising at least one coating layer leads to better printing results, for example in terms of print gloss or ink density, compared to direct printing on a wood-based board that does not comprise a coating layer according to the invention.

According to another embodiment, the at least one decorative finishing of step g) is carried out by applying a decorative paper. The decorative paper of step g) may be any paper known in the art for the decorative finishing of wood-based boards. The decorative paper may be printed and/or coated. Furthermore, the decorative paper may be impregnated or contacted with thermosetting or adhesive agents such as melamine-formaldehyde resins, urea-formaldehyde resins, polyester resins, phenolic resins, polyvinyl acetate- or acrylic-based adhesives, and/or combinations thereof. Additionally, the decorative paper may be contacted with any other agents known in the art of manufacturing decorated wood-based boards such as resin hardener or wetting agents. Preferably, the decorative paper is a light basis weight paper with a weight in the range from 20 to 120 g/m2, more preferably from 30 to 80 g/m2, and most preferably from 40 to 70 g/m2. The decorative paper of step g) can be applied to the wood-based board by any means known in the art of wood-based board. For example, the decorative paper of step g) can be applied under heat and pressure in a short cycle press.

The inventors surprisingly found out that the side of a wood-based board comprising the at least one coating layer of step e) shows an improved adhesiveness as measured in accordance with the norm DIN EN ISO 2409:2013 to a decorated paper, which leads to a stronger holdout of the decorative paper to the wood-based board. Furthermore, it was found that the improved optical characteristics of the coated side of the wood-based board also have an advantageous effect on the optical characteristics on the side of the wood-based board that is finished with a decorated paper. In other words, if a coating layer is present underneath the decorative paper of the wood-based board the overall brightness is improved compared to a decorative wood-based board which does not comprise a coating layer underneath the paper.

According to another embodiment, the at least one decorative finishing of step g) is carried out by applying a decorative foil. The decorative foil of step g) can be a thermoplastic foil. Suitable thermoplastic foils may be, for example, polypropylene foils or polyvinyl chloride foils. However, decorative paper foils such as high or low pressure laminates and or melamine foils may also be used. Furthermore, the decorative foil may be impregnated/contacted with thermosetting or adhesive agents such as melamine-formaldehyde resins, urea-formaldehyde resins, polyester resins, phenolic resins, polyvinyl acetate- or acrylic-based adhesives, and/or combinations thereof. The decorative foil of step g) can be applied to the wood-based board by any means known in the art of wood-based board, for example, by a membrane vacuum press.

According to yet another embodiment of the present invention, the at least one decorative finishing of step g) is carried out by applying a liquid coating. The liquid coating can be a varnish, a lacquer layer or any other liquid coating suitable to decorate a wood-based board.

According to a preferred embodiment, the at least one decorative finishing is applied as a liquid coating being a lacquer layer. The lacquer of step g) may be selected from clear or coloured lacquer, preferably clear lacquer. It may be a water-based lacquer, such as a water-based acrylic latex lacquer, or, alternatively, a solvent-based lacquer. Non-limited examples of solvent based lacquers are nitrocellulose lacquer, lacquer based on alkyd resin, epoxide resin, urea-formaldehyde resin or polyurethane lacquer, or lacquer based on acrylic polymers or other synthetic polymers. However, any other lacquer that is applicable as liquid coating for decorative wood-based boards known to the skilled person may also be used.

The liquid coating of step g) can be applied by spray coating, curtain coating, flow coating, brushing, wiping, dipping or by any other measure known to the skilled person for applying lacquer to a surface. The liquid coating may further be submitted to a step g2) of drying the liquid coating. This drying step may be carried out by any means known in the art such as (hot) airflow, infrared, microwave or ultra violet radiation etc.

Characterization of Optional Steps h) and i):

The process according to the invention may further comprise optional process steps, such as applying a protective layer or a backing layer, to improve the mechanical properties of the board, the wear resistance and/or the abrasiveness.

According to one embodiment, the inventive process further comprises a step h) of applying at least one protective layer on the at least one decorative finishing obtained in step g).

The term "at least one" protective layer in the meaning of the present invention means that step h) may comprise applying one or more protective layer(s) on the at least one decorative finishing obtained in step g).

In one embodiment of the present invention, step h) may comprise applying one protective layer. Alternatively, step h) may comprise applying two or more protective layers. For example, step h) of the present invention may comprise applying two or three protective layers. Preferably, step h) comprises applying one protective layer.

The protective layer may comprise any transparent non-thermoplastic resin known in the art to protect a decorated or non-decorated surface of a wood-based board from abrasion, chemicals, heat or any other external influence that deteriorates the properties of the wood-based board's surface.

According to one embodiment, the at least one protective layer of step h) of the inventive process comprises a transparent non-thermoplastic resin, preferably selected from the group consisting of urea-formaldehyde resins, melamine-resins, epoxy-resins and mixtures thereof.

The at least one protective layer may be applied onto the decorated wood-based board by conventional means commonly used in this art. Suitable methods to apply a protective layer are, e.g., metering size press, curtain coating, spray coating, roller coating, powder coating and the like. However, any other method which would be suitable to form at least one protective layer on the decorative wood-based board may also be used.

In case that the decorative finishing is only present on one side of the wood-based board, the process may further comprise a step i) of applying any type of backing layer commonly used in the art on the side of the decorative wood-based board opposite to the decorative finishing. Thus, according to one embodiment, in case the at least one decorative finishing is only present on one side, the process according to the invention may further comprise a step i) of applying at least one backing layer on the side of the decorative wood-based board opposite to the at least one decorative finishing.

The term "at least one" backing layer in the meaning of the present invention means that step i) may comprise applying one or more backing layer(s) on the side opposite to the at least one decorative finishing obtained in step g).

In one embodiment of the present invention, step i) may comprise applying one backing layer. Alternatively, step i) may comprise applying two or more backing layers. For example, step i) of the present invention may comprise applying two or three backing layers. Preferably, step h) comprises applying one backing layer.

The step i) may be carried out in addition to the above-described optional step h) or as a single step, i.e. the inventive process may only further comprise optional step i). According to one embodiment, the inventive process further comprises step h) and step i). According to another embodiment, the inventive process further comprises step h) or step i). The optional process steps h) and/or i) may be carried out in any order known to the skilled person, preferably in the order which allows for the most efficient manufacturing process.

According to a preferred embodiment, the backing layer of step i) is applied in form of a paper. The paper may have a weight in the range from 60 to 140 g/m2, preferably in the range of 80 to 90 g/m2. However, any other paper that is applicable as a backing layer for a wood-based board may be used as well. The paper may be impregnated/contacted with thermosetting or adhesive agents such as melamine-formaldehyde resins, urea-formaldehyde resins, polyester resins, phenolic resins, polyvinyl acetate- or acrylic-based adhesives, and/or combinations thereof. The paper may further be applied to the decorative wood-based board by any means known in the art of manufacturing of wood-based boards. For example, the paper may be applied under heat and pressure in a short cycle press.

Decorative Wood-Based Board and Uses

According to one aspect of the present invention, a decorative wood-based board is provided.

The decorative wood-based board comprises
a) a base of wood particles and/or fibres as defined herein, and
b) at least one coating layer on the first and/or reverse side of the solid wood-based board, wherein the coating comprises
  i) at least one inorganic particulate filler material, as defined herein, having a ratio of particle size $d_{80}$ to particle size $d_{20}$ [$d_{80}/d_{20}$] from 0.5 to 1.0, and
  ii) at least one binder as defined herein.
c) at least one decorative finishing on the first and/or reverse side of the wood-based board.

With regard to the definition of the wood particles and/or fibres, at least one inorganic particulate filler material, at least one binder and optional base binder, additives and compounds, and preferred embodiments thereof, reference is made to the statements provided above when discussing the technical details of the process of the present invention.

The decorative wood-based board comprises
a) a base of wood particles and/or fibres as defined herein, and
b) at least one coating layer on the first and/or reverse side of the solid wood-based board, wherein the coating comprises
  i) at least one inorganic particulate filler material, as defined herein, having a ratio of particle size $d_{80}$ to particle size $d_{20}$ [$d_{80}/d_{20}$] from 0.5 to 1.0, and
  ii) at least one binder as defined herein.
c) at least one decorative finishing on the first and/or reverse side of the wood-based board is preferably obtained by a process comprising the steps of:
a) providing wood particles and/or fibres, in dry form or in form of an aqueous suspension,
b) providing at least one dry or liquid coating composition comprising at least one inorganic particulate filler material and at least one binder,
c) forming a wood-based mat having a first side and a reverse side from the wood particles and/or fibres provided in step a),
d) pre-pressing the wood-based mat of step c) into a pre-pressed wood-based mat,
e) applying at least one layer of the at least one dry or liquid coating composition of step b) on the first and/or reverse side of the pre-pressed wood-based mat obtained in step d),
f) hot pressing the pre-pressed wood-based mat obtained in step e) into a solid wood-based board,
g) applying at least one decorative finishing on the first and/or reverse side of the wood-based board obtained in step f) by inkjet-printing, by rotogravure-printing, by applying a decorative paper, a decorative foil or a liquid coating.

The decorative wood-based board is preferably a fibre board product, more preferably a high-density fibre (HDF) board, medium-density fibre (MDF) board, low-density fibre (LDF) board, a particle board, an oriented strandboard (OSB), a hardboard or an insulation board.

The inventive decorative wood-based board can be a single or multi-layer wood-based board. If the decorative wood-based board is a multi-layer board, the board can be a three-layer or five-layer wood-based board. For example, the wood-based board is a single-layer wood-based board.

In one embodiment, the at least one coating layer is preferably at least partially penetrated into the surface of the wood-based board. Thus, it is preferred that the at least one coating layer cannot be removed from the surface of the wood-based board without damaging the surface of the surface of the decorative wood-based board.

The inventive decorative wood-based board comprises a base of wood particles and/or fibres having a first side and a reverse side. The base of wood particles and/or fibres serves as support for the at least one coating layer on the first and/or reverse side of the wood-based board. Thus, the wood-based board preferably comprises, more preferably consists of, a base of wood particles and/or fibres having a first side and a reverse side and at least one coating layer being in contact with the first and/or reverse side of the base of wood particles and/or fibres.

In one embodiment of the present invention, the at least one decorative finishing is present on the at least one coating layer on the first and/or reverse side of the wood-based board.

According to another embodiment of the present invention, the at least one decorative finishing is present on one side of the wood-based board and the at least one coating layer is present on the opposite side of the wood-based board and represents a backing layer or is part of a backing layer.

The inventors surprisingly found out that in case the coating layer is present on the opposite side of the side comprising the decorative finishing, it is of no or less importance to apply a backing layer as defined in optional step i). In such case, the coating layer on the opposite side of the decorative finishing serves as a backing layer or is part of a backing layer, and imparts improved mechanical properties, especially tensile strength, to the decorative wood-based board.

The at least one inorganic particulate filler material preferably has
  i) a particle size $d_{98}$ of <500 µm,
  ii) a particle size $d_{80}$ of 0.1 to 250 µm,
  iii) a median particle size $d_{50}$ of 0.1 to 150 µm, and
  iv) a particle size $d_{20}$ of 0.1 to 50 µm.

It is appreciated that the wood-based board is especially advantageous with regard to its surface characteristics, such as optical properties and surface smoothness. In this regard, it is to be noted that the advantageous surface characteristics apply only to the side of the wood-based board which has been coated in accordance with process of the present invention.

In one embodiment, the surface of the coated side of the decorative wood-based board preferably has
  i) a brightness from 50 to 100%, according ISO R457 (Tappi452) and DIN 6167,
  ii) a yellowness from 2 to 70%, according ISO R457 (Tappi452) and DIN 6167,
  iii) L* from 50 to 100, according to DIN EN ISO 11664-4:2012,
  iv) a* from −5 to 10, according to DIN EN ISO 11664-4:2012, and
  v) b* from 0 to 30, according to DIN EN ISO 11664-4:2012.

Additionally or alternatively, the surface of the coated side of the decorative wood-based board has
  i) a maximum roughness amplitude Sz from 20 to 800 µm,
  ii) an arithmetic mean roughness Sa from 2 to 80 µm, and
  iii) a root mean square roughness Sq from 2 to 20 µm.

In one embodiment, the surface of the coated side of the decorative wood-based board preferably has
  i) a brightness from 50 to 100%, according ISO R457 (Tappi452) and DIN 6167,
  ii) a yellowness from 2 to 70%, according ISO R457 (Tappi452) and DIN 6167,
  iii) L* from 50 to 100, according to DIN EN ISO 11664-4:2012,
  iv) a* from −5 to 10, according to DIN EN ISO 11664-4:2012, and
  v) b* from 0 to 30, according to DIN EN ISO 11664-4:2012,
and
  i) a maximum roughness (average roughness) amplitude Sz from 20 to 800 µm,
  ii) an arithmetic mean roughness Sa from 2 to 80 µm, and
  iii) a root mean square mean roughness Sq from 2 to 20 µm.

According to one preferred embodiment, the at least one inorganic particulate filler material has
  i) a particle size $d_{98}$ of <500 µm,
  ii) a particle size $d_{80}$ of 0.1 to 250 µm,
  iii) a median particle size $d_{50}$ of 0.1 to 150 µm, and
  iv) a particle size $d_{20}$ of 0.1 to 50 µm,
and the surface of the coated side of the decorative wood-based board has
  i) a brightness from 50 to 100%, according ISO R457 (Tappi452) and DIN 6167,
  ii) a yellowness from 2 to 70%, according ISO R457 (Tappi452) and DIN 6167,
  iii) L* from 50 to 100, according to DIN EN ISO 11664-4:2012,
  iv) a* from −5 to 10, according to DIN EN ISO 11664-4:2012, and
  v) b* from 0 to 30, according to DIN EN ISO 11664-4:2012,
and
  i) a maximum roughness amplitude Sz from 20 to 800 µm,
  ii) an arithmetic mean roughness Sa from 2 to 80 µm, and
  iii) a root mean square roughness Sq from 2 to 20 µm.

According to one embodiment, the surface of the coated side of the decorative wood-based board has a contact angle in the range of 5° to 80°, more preferably in the range of 8° to 60°, and most preferably in the range of 8° to 50°. The "contact angle" in the meaning of the present invention is the angle at which a liquid meets a solid surface. The contact angle may be used to quantify the wettability of a surface. "Wettability" in the meaning of the present application is the ability of a liquid to maintain contact with a solid surface. A low contact angle is usually equivalent to a high wettability of a surface.

The decorative wood-based board according to the present invention specifically features high mechanical properties such as bending strength and modulus of elasticity, internal bond strength and thickness swelling.

The inventive decorative wood-based board specifically features a high bending strength. Preferably, the decorative wood-based board has a bending strength of ≥5 N/mm2, preferably from 10 to 50 N/mm2 and most preferably from 15 to 45 N/mm2. Unless indicated otherwise, the bending strength is determined according to DIN EN 310.

Additionally or alternatively, the inventive decorative wood-based board features a high modulus of elasticity. Preferably, the decorative wood-based board has a modulus of elasticity ≥500 N/mm2, preferably from 1 000 to 4 500 N/mm2 and most preferably from 1 500 to 3 500 N/mm2. Unless indicated otherwise, the modulus of elasticity is determined according to DIN EN 310.

Additionally or alternatively, the inventive decorative wood-based board features a high internal bond strength. Preferably, the decorative wood-based board has an internal bond strength ≥0.10 N/mm2, more preferably from 0.2 to 1.4 N/mm2 and most preferably from 0.4 to 1.2 N/mm2. Unless indicated otherwise, the internal bond strength is determined according to DIN EN 319. It is appreciated that the internal bond strength may be also named as transverse tensile strength.

Additionally or alternatively, the inventive decorative wood-based board features a high thickness swelling. Preferably, the decorative wood-based board has a thickness swelling after 24 h water storage of ≤20%, more preferably from 2.0 to 15.0% and most preferably from 4.0 to 10%. Unless indicated otherwise, the thickness swelling is determined according to DIN EN 317.

Additionally or alternatively, the inventive decorative wood-based board features a high brightness. Preferably, the decorative wood-based board has a brightness of at least 50%, more preferably of at least 65%, even more preferably of at least 75% and most preferably of at least 80%. Unless indicated otherwise, the brightness is determined according to ISO R457 (Tappi452) and DIN 6167.

For example, the decorative wood-based board has a bending strength of ≥5 N/mm2, preferably from 10 to 50 N/mm2 and most preferably from 15 to 45 N/mm2; or a modulus of elasticity of ≥500 N/mm2, preferably from 1 000 to 4 500 N/mm2 and most preferably from 1 500 to 3 500 N/mm2; or an internal bond strength of ≥0.10 N/mm2, more preferably from 0.2 to 1.4 N/mm2 and most preferably from 0.4 to 1.2 N/mm2; or a thickness swelling after 24 h water storage of ≤20%, more preferably from 2.0 to 15.0% and most preferably from 4.0 to 10%; or a brightness of at least 50%, more preferably of at least 65%, even more preferably of at least 75% and most preferably of at least 80%.

Alternatively, the decorative wood-based board has a bending strength of ≥5 N/mm2, preferably from 10 to 50 N/mm2 and most preferably from 15 to 45 N/mm2; and a modulus of elasticity of ≥500 N/mm2, preferably from 1 000 to 4 500 N/mm2 and most preferably from 1 500 to 3 500 N/mm2; and an internal bond strength of ≥0.10 N/mm2, more preferably from 0.2 to 1.4 N/mm2 and most preferably from 0.4 to 1.2 N/mm2; and a thickness swelling after 24 h water storage of ≤20%, more preferably from 2.0 to 15.0% and most preferably from 4.0 to 10%; and a brightness of at least 50%, more preferably of at least 65%, even more preferably of at least 75% and most preferably of at least 80%.

Furthermore, the decorative wood-based board of the present invention preferably features at least one coated side with a high surface density. Thus, in one embodiment, the decorative wood-based board comprises at least one coated side of the decorative wood-based board has a surface density ranging from 900 to 2 500 kg/m3, preferably from 1 200 to 2 400 kg/m$^3$ and most preferably from 1 600 to 2 300 kg/m3. The surface density of the decorative wood-based board may be determined with any device known in the art for the measurement of density profiles of wood-based board. For example, the measurements can be carried out with a GreCon DAX6000® raw density profile analyser using a feed speed of 0.5 mm/s, an incrementation parameter of 20 μm, an X-ray working voltage of 40 kV and a sample size of 250 mm2.

In one embodiment, the decorative wood-based board of the present invention has a thickness from 0.2 to 300.0 mm, preferably from 2.0 to 40.0 mm and most preferably from 4.0 to 20 mm.

In case the at least one decorative finishing of step g) is carried out by inkjet-printing and/or rotogravure printing, the printed surface of the decorated wood-based board preferably has a specific print gloss. According to one embodiment, the print gloss of cyan-, magenta-, yellow- and/or black-coloured inks present on the decorative wood-based board preferably ranges from 1 to 90%, more preferably from 1 to 70%, and most preferably from 10 to 50%. Unless indicated otherwise, the print gloss is measured according to the norm EN ISO 8254-1:2003. Additionally or alternatively, the printed surface of the decorated wood-based board preferably has a specific ink density. The "ink density" in the meaning of the present application is a calculated value which may be obtained by measuring the reflected light of a printed substrate in a specific angle, usually 90°, while illuminating the printed substrate from a different angle, usually 45°, with a light source. The term "ink density" and devices for measuring the same are well known in the art. Preferably, the ink density of cyan- magenta-yellow- and/or black-coloured inks present on the decorative wood-based board ranges from 0.1 to 10, more preferably from 0.2 to 5, most preferably from 0.3 to 1.2.

According to one embodiment, the decorative wood-based board further comprises
  d) at least one protective layer on the at least one decorative finishing and/or
  e) in case that the at least one decorative finishing is only present on one side, at least one backing layer on the side of the decorative wood-based board opposite to the at least one decorative finishing, preferably in form of a paper.

The decorative wood-based board further comprising
  d) at least one protective layer on the at least one decorative finishing and/or
  e) in case that the at least one decorative finishing is only present on one side, at least one backing layer on the side of the decorative wood-based board opposite to the at least one decorative finishing is preferably obtained by a process comprising the further steps of:
  h) applying at least one protective layer on the at least one decorative finishing obtained in step g), and/or
  i) in case that the at least one decorative finishing is only present on one side, applying at least one backing layer on the side of the decorative wood-based board opposite to the at least one decorative finishing.

According to one preferred embodiment, the at least one protective layer d) comprises a transparent non-thermoplastic resin, preferably selected from the group consisting of urea-formaldehyde resins, melamine-resins, epoxy-resins and mixtures thereof.

According to one preferred embodiment, the backing layer e) is a paper. The paper may have a weight in the range from 60 to 140 g/m2, preferably in the range of 80 to 90 g/m2. However, any other paper that is applicable as a backing layer for a wood-based board may be used as well.

According to another aspect, the present invention refers to a use of at least one dry or liquid coating composition as defined herein for in-line coating of decorative wood-based boards. With regard to the definition of the at least one dry or liquid coating composition comprising at least one inorganic particulate filler material and at least one binder and preferred embodiments thereof, reference is made to the statements provided above when discussing the technical details of the process of the present invention.

An "in-line" coating or process in the meaning of the present invention refers to a process in which the coating step is placed in series, especially horizontally in series, with a pre-pressing and hot pressing step. In other words, the at least one dry or liquid coating composition comprising at least one inorganic particulate filler material and at least one binder is applied on the first and/or reverse side of a pre-pressed wood-based mat, i.e. after pre-pressing, but before hot pressing the coated pre-pressed wood-based mat to form the solid wood-based board.

According to another aspect of the present invention, a use of at least one dry or liquid coating composition as defined herein for improving the mechanical properties of a decorative wood-based board and especially the bending strength, modulus of elasticity, internal bond strength and/or thickness swelling, is provided.

According to another aspect of the present invention, a use of a decorative wood-based board as defined herein in flooring applications, furniture, walls, preferably wall panels, roof panels, display cabinets, storage units, loudspeakers, preferably loudspeaker boxes and shop-fittings, is provided.

The scope and interest of the invention will be better understood based on the following examples which are intended to illustrate certain embodiments of the invention and are non-limitative.

EXAMPLES

Measurement Methods

Figure 1:
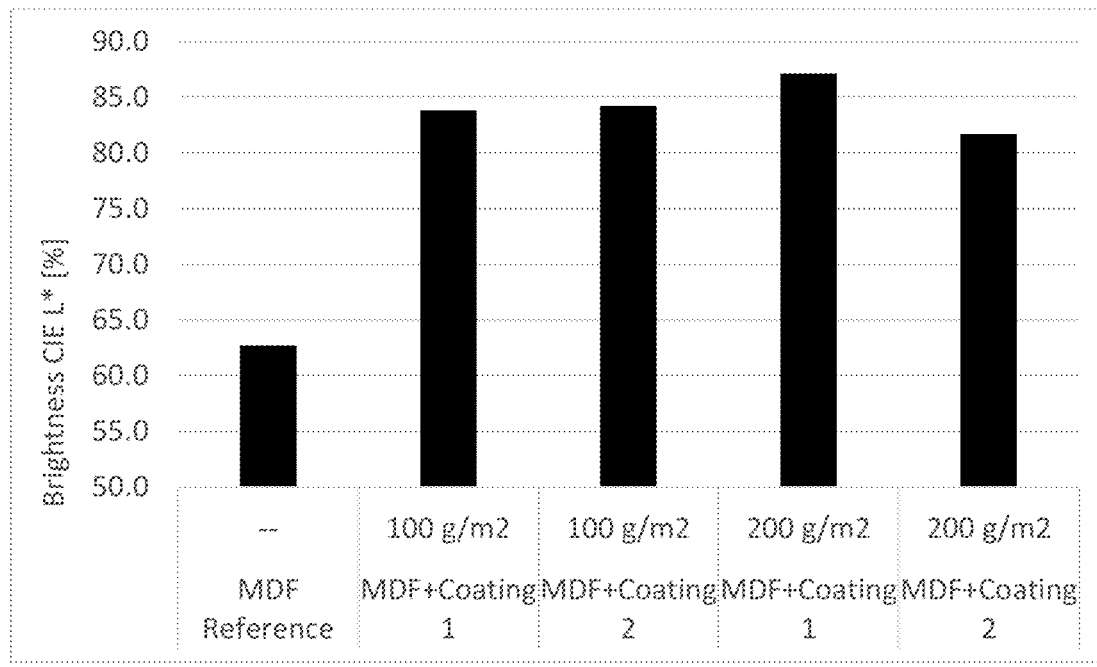
FIG. 1: Brightness CIE L* of the surface of medium density fibre boards coated according to the inventive process.

The following measurement methods are used to evaluate the parameters given in the examples and claims.

Particle size distribution (weight % particles with a diameter <X) and weight median diameter ($d_{50}$) of a particulate filler material having a particle size $d_{50}$ of ≤45 µm Weight median grain diameter and grain diameter weight distribution of an inorganic particulate filler material such as calcium carbonate, were determined via the sedimentation method, i.e. an analysis of sedimentation behaviour in a gravimetric field. The measurement was made with a Sedigraph™ 5120.

The method and instrument are known to the skilled person and are commonly used to determine grain size of fillers and pigments. The measurements are carried out in an aqueous solution of 0.1 wt.-% $Na_4P_2O_7$. The samples were dispersed using a high speed mixer and ultrasound.

BET Specific Surface Area of a Material

Throughout the present document, the specific surface area (in m2/g) of the inorganic particulate filler material is determined using the BET method (using nitrogen as adsorbing gas), which is well known to the skilled man (ISO 9277:1995). The total surface area (in m2) of the inorganic particulate filler material is then obtained by multiplication of the specific surface area and the mass (in g) of the inorganic particulate filler material prior to treatment.

Solids Content of an Aqueous Suspension

The suspension solids content (also known as "dry weight") was determined using a Moisture Analyser HR73 from the company Mettler-Toledo, Switzerland, with the following settings: temperature of 120° C., automatic switch off 3, standard drying, 5 to 20 g of suspension.

pH of an Aqueous Suspension

The pH of a suspension or solution was measured at 25° C. using a Mettler Toledo Seven Easy pH meter and a Mettler Toledo InLab® Expert Pro pH electrode. A three-point calibration (according to the segment method) of the instrument was first made using commercially available buffer solutions having pH values of 4, 7 and 10 at 20° C. (from Sigma-Aldrich Corp., USA). The reported pH values are the endpoint values detected by the instrument (the endpoint was when the measured signal differed by less than 0.1 mV from the average over the last 6 seconds).

Brookfield Viscosity

For the purpose of the present invention, the term "viscosity" or "Brookfield viscosity" refers to Brookfield viscosity. The Brookfield viscosity is for this purpose measured by a Brookfield DV-III Ultra viscometer at 24° C.±3° C. at 100 rpm using an appropriate spindle of the Brookfield RV-spindle set and is specified in mPa·s. Once the spindle has been inserted into the sample, the measurement is started with a constant rotating speed of 100 rpm. The reported Brookfield viscosity values are the values displayed 60 seconds after the start of the measurement. Based on his technical knowledge, the skilled person will select a spindle from the Brookfield RV-spindle set which is suitable for the viscosity range to be measured. For example, for a viscosity range between 200 and 800 mPa·s spindle number 3 may be used, for a viscosity range between 400 and 1600 mPa·s spindle number 4 may be used, for a viscosity range between 800 and 3200 mPa·s spindle number 5 may be used, for a viscosity range between 1000 and 2000000 mPa·s spindle number 6 may be used, and for a viscosity range between 4000 and 8000000 mPa·s spindle number 7 may be used.

Size of Wood Fibres

The size of the fibres was determined via fractioning by using sieve analysis. The measurement was made with an air jet sieve from Alpine e200 LS of HOSOKAWA ALPINE AG, Germany.

The measurement was carried out by applying an air flow to the fibres being placed in a sieve by a rotating slit nozzle located underneath the sieve. The fibres are thus subjected to a fractioning by air dispersing and simultaneous suction of the fibres through the sieve over a time period of 5 min. The balance between the amount of fibre before being placed in the sieve and after fractioning was considered as the through fraction in gram. Depending on the number of the chosen sieve mesh widths, the fractioning is repeated starting with the smallest sieve mesh widths to the largest sieve mesh width. Thus, for each sieve mesh width the percentage of the total amount of the fibres which is fractionized can be calculated. The mesh widths of the sieves were chosen among the following mesh widths (in mm): 0.05-0.063-0.08-0.1-0.125-0.2-0.315-0.4-0.5-0.63-0.8-1.0-1.6-2.0-3.0-3.15-4.0-5.0. For each analysis, at least three sieve mesh widths were chosen such that the size of the fibres was sufficiently covered by the chosen mesh widths. Unless otherwise indicated the size of the fibres is measured at a sieve mesh width of 0.05 mm, 1.0 mm and 3.0 mm.

Wood Moisture Content

The wood moisture content is determined in accordance with DIN EN 322. The term "equilibrium moisture" has to be understood as moisture content of wood or wood-based board at which the wood neither gains nor loses moisture when surrounded by air at a given relative humidity and temperature (definition in "wood hand book") The moisture content was determined after 7 days storage in a defined climate of: 65% relative humidity and 20° C. temperature.

Evaluation of Surface Roughness

Roughness was determined by topographical measurements using Nanoskop device from COTEM MESSSYS-TEME. Measuring standard was for the x-axis: measuring length: 4.8 mm, resolution: 500 points and for the y-axis: measuring length 4.8 mm, resolution: 250 points, applying high-pass filter Gauss. Values:

Sz=maximum roughness amplitude
Sa=arithmetic mean roughness
Sq=root mean square roughness Brightness and Yellowness Brightness and yellowness were measured using an ELREPHO 450, Datacolor according ISO R457 (Tappi452) and DIN 6167. The CIELAB L*, a*, b* coordinates and brightness CIE were measured using Minolta-Spectrophotometer CM-3610d (OF 22) in accordance with DIN EN ISO 11664-4:2012.

Print Gloss

The gloss on the printed cyan (C), magenta (M), yellow (Y) and black (K) colours was determined according to EN ISO 8254-1:2003, TAPPI 75° (%) using a Schnettler Technologies STGL-3W measuring device. The average value of n=10 measurements (thereof n=5 in print direction and n=5 in cross direction) are compared.

Ink Density

The ink density of the printed cyan (C), magenta (M), yellow (Y) and black (K) colours on the wood-based boards was determined with Techkon SpectroDens Advanced Densitometer. The chosen mode was "automatic density measurement".

Contact Angle

The contact angle was determined using the measuring device OCA 20 from DataPhysics, by analysing the contact angle of polar fluid (water) when in contact with a substrate. The number of measurements was n=12 per trial point. The contact angle was determined after a wetting time of six seconds.

Thickness Swelling

Thickness swelling measurements were made after 24 h water exposure in accordance with DIN EN 317.

Internal Bond Strength

Internal bond strength measurements were made in accordance with DIN EN 319.

Bending Strength and Modulus of Elasticity

Bending strength and modulus of elasticity were measured in accordance with DIN EN 310.

Adhesiveness of Decorative Paper to in-Line Coated Wood-Based Boards

The adhesiveness of a decorative paper applied onto the untreated or by in-line coating treated surface of the wood-based board was determined in accordance with the DIN EN ISO 2409:2013 (german version): Cross-cut test. A "1c" cutter with a rigid blade was used to cut six parallel cuts with a distance between the blades of 3 mm and six parallel cuts perpendicular to the first six cuts resulting in a lattice of squares. Loose particles, splitters or spalls were removed with a tape (Tesa 4331, 50 mm width). The classification of the cross-cut characteristic value was determined following the table below:

TABLE 1

Description of cross-cut test values

| Classification | Description |
| --- | --- |
| 0 | The edges of the cuts are completely smooth; none of the squares of the lattice is detached. |
| 1 | Detachment of small flakes of the coating at the intersection of the cuts. A cross-cut area not greater than 5% is affected. |
| 2 | The coating has flaked along the edges and/or at the intersections of the cuts. A cross-cut area greater than 5%, but not greater than 15%, is affected. |
| 3 | The coating has flaked along the edges of the cuts partly or wholly in large ribbons, and/or it has flaked partly or wholly on different parts of the squares. A cross-cut area greater than 15%, but not greater than 35%, is affected. |
| 4 | The coating has flaked along the edges of the cuts in large ribbons and/or squares have detached partly or wholly. A cross-cut area greater than 35%, but not greater than 65%, is affected |
| 5 | Any degree of flaking that cannot even be classified by classification 4. |

Raw Density

The raw density profile of the in-line coated wood-based boards was determined by using the lab device DAX 6000 from GreCon. The measurement system uses an X-ray tube which emits X-ray radiation through a sample of the respective wood-based board. Part of the X-ray radiation is absorbed, depending on the density of the material. The ionization chamber receives the non-absorbed X-ray radiation and transfers it into electrical signals. These signals are transformed into a raw density value. The raw density profile is visualized in a raw density profile curve.

The measurements were conducted using the system settings displayed in Table 2:

TABLE 2

Parameters for raw density measurements

| Parameter | Unit | Value |
|---|---|---|
| Feed speed | [mm/s] | 0.5 |
| incrementation parameter | [μm] | 20 |
| Accuracy | [%] | ±0.5 |
| Working voltage X-ray | [kV] | 40 |
| Sample size | [mm] | 50 * 50 |

1) Production of in-Line Coated Wood-Based Boards

Parameters for the production of in-line coated medium density fibre board are displayed in Table 3.

TABLE 3

Production parameters

| Panel Structure | Single layer |
|---|---|
| Raw Material | Pine fibres |
| Panel Thickness | 8.0 mm |
| Raw Density | 700 kg/m³ |
| Press Temperature | 200° C. |
| Press Time Factor | 12 s/mm |
| Amount Of Binder | 10% |
| Type Of Binder | K345, 68% BASF |
| Hydrophobing Agent | 1.0% Hydrowax 138, Sasol Germany |
| Dry Coat Weight | 100 g/m² or 200 g/m² |

Production Set-Up [Step a) to f) of the Inventive Process]:

1) Resin (binder) application on wood fibres (for medium density fibre board) and addition of hydrophobing agent in blender (resin application of surface layer wood fibres and middle layer fibres was executed separately).
2) Resinated wood fibres were formed into a wood-based mat by manual spreading.
3) Wood-based mat was pre-pressed at ambient temperature, i.e. at a temperature of 23° C. 2° C.
4) Coating 1 or coating 2 (see Table 4 and 5) were applied on the one side of the pre-pressed wood fibre mat by air-pressure paint spray gun. Coat weight was 100 g/m² or 200 g/m² (dry), respectively.
5) A release paper commonly used in the art was applied between the coated side of the pre-pressed wood fibre mat and the press plate to provide easier release of the hot-pressed wood-based board from the hot press plate.
6) Pre-pressed and coated wood fibre was pressed to solid wood-based board in a hot press under the above defined conditions.

TABLE 4

Composition of coating 1
Coating 1

| | Product | Parts by weight |
|---|---|---|
| Raw materials | | |
| Calcium carbonate 1 | Natural ground calcium carbonate, commercially available from Omya International AG, Switzerland; $d_{98}$: 7.0 μm; $d_{50}$: 1.5 μm; BET: 6.9 g/m²; Brightness: 95.6%; yellowness index: 0.75; CIELAB L*: 98.5; | 100.0 |

TABLE 4-continued

Composition of coating 1
Coating 1

| | Product | Parts by weight |
|---|---|---|
| | CIELAB a*: −0.1; CIELAB b*: 0.4; 78% aqueous suspension, based on the total weight of the suspension | |
| Polyvinyl alcohol | PVA BF-04, Chang Chun Petrochemicals | 8.0 |
| Starch | C*Film 07311, Cargill | 2.0 |
| Total | | 110.0 |
| Coating characteristics | | |
| Solids [%] | 65.8 | |
| pH | 9.2 | |
| Viscosity [mPas] (RPM 100, Spindle 3, Temp.: 32° C.) | 730 | |

TABLE 5

Composition of coating 2
Coating 2

| | Product | Parts by weight |
|---|---|---|
| Raw materials | | |
| Calcium carbonate 2 | Modified calcium carbonate, commercially available from Omya International AG, Switzerland; $d_{98}$: 4.0 μm; $d_{50}$: 0.975 μm; BET: 28.69 g/m²; brightness: 92.7%; yellowness index: 2.9; CIELAB L*: 97.9; CIELAB a*: 0.009; CIELAB b*: 1.57; 50% aqueous suspension, based on the total weight of the suspension | 100.0 |
| Polyvinyl alcohol | PVA BF-04, Chang Chun Petrochemicals | 8.0 |
| Starch | C*Film 07311, Cargill | 2.0 |
| Total | | 110.0 |
| Coating characteristics | | |
| Solids [%] | 45.8 | |
| pH | 8.7 | |
| Viscosity [mPas] (RPM 100, Spindle 3, temp.: 26° C.) | 290 | |

The inventive board shows improved optical and physical properties after in-line coating, i.e. step f) of the inventive process, compared to a non-coated reference wood-based board (see FIGS. 1 to 5).

Due to the in-line coating process, the brightness CIE L* values of the coated surface of all boards obtained after process step f) are increased compared to the uncoated reference board (see FIG. 1). For example, for a medium density fibre board coated with 200 g/m2 of coating 1 the brightness CIE L* value of the coated surface of the wood-based board increases by 39% compared to the reference.

Figure 2:
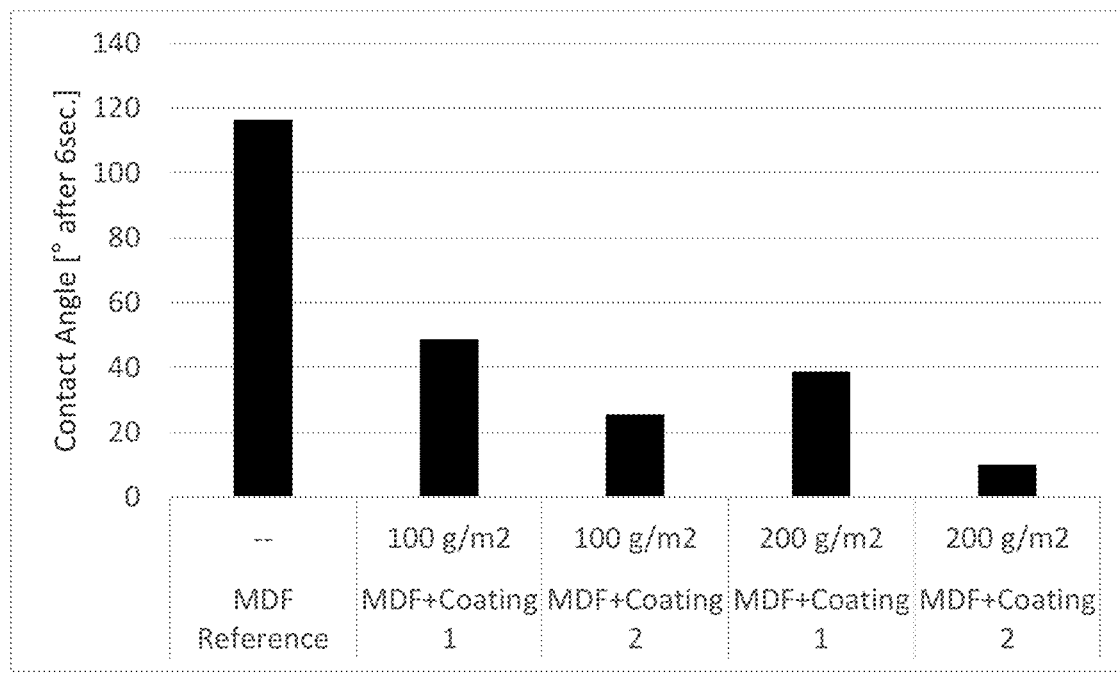
FIG. 2: Contact angle after a wetting time of six seconds between water and the surface of medium density fibre boards coated according to the inventive process.
Figure 3:
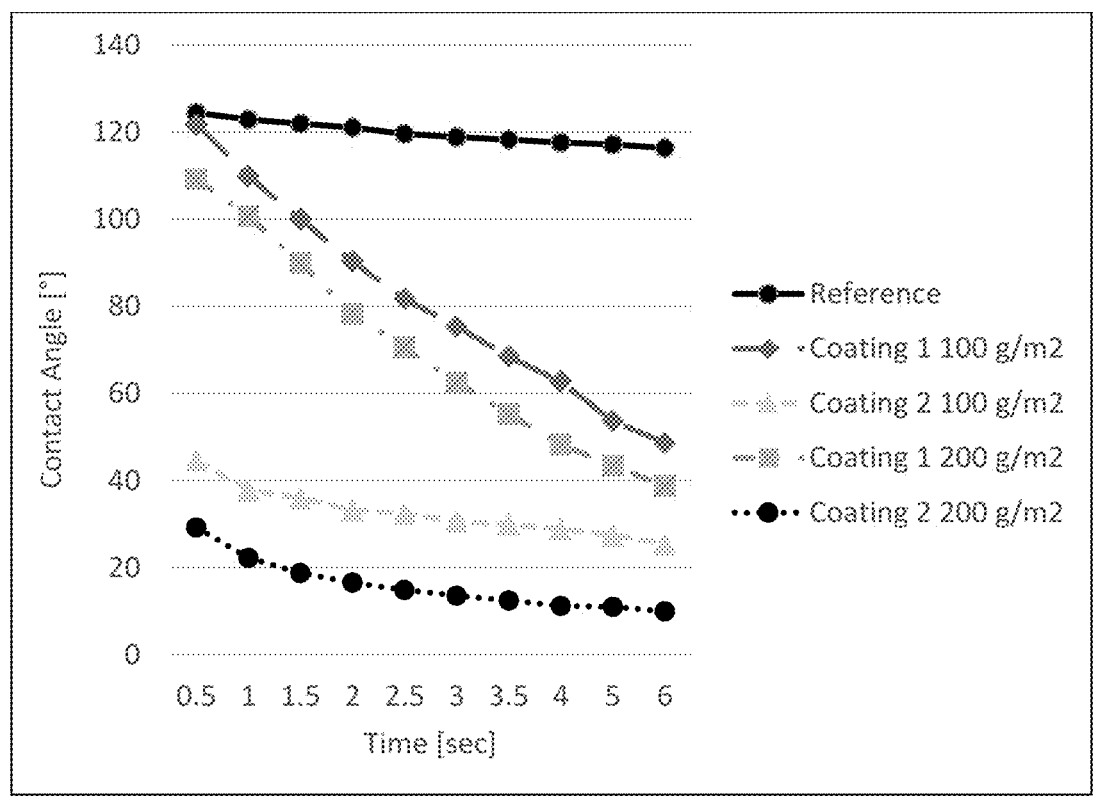
FIG. 3: Change of the contact angle over a period of six seconds between water and the surface of medium density fibre boards coated according to the inventive process.
Figure 4:
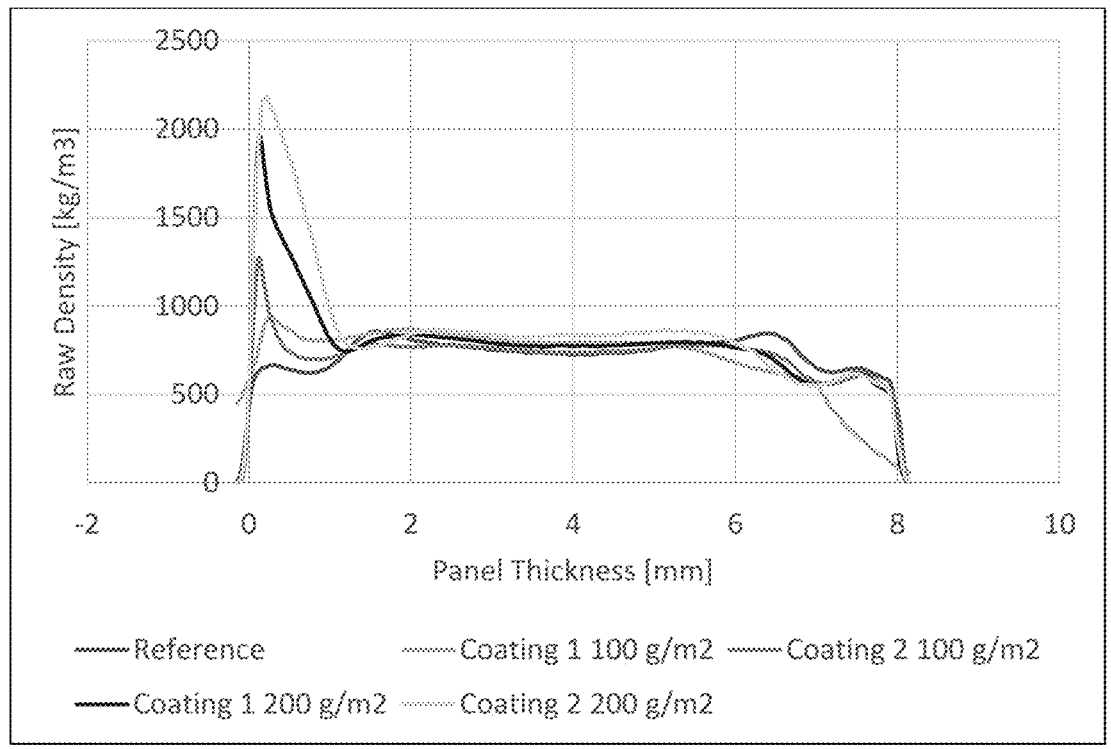
FIG. 4: Raw density profiles of medium density fibre boards coated according to the inventive process.

Furthermore, the contact angle of the coated surface of all wood-based boards obtained after step f) was reduced compared to the uncoated board (see FIG. 2). A low contact angle, respectively a high wettability with water, indicates an improved uptake of (water-based) inks, when direct printing, e.g. by ink-jet printing or rotogravure printing, is applied as decorative finishing in process step g). The dynamical contact angle development, i.e. the change of contact angle with time, also shows an improvement of the surface wettability of the inventive wood-based boards (see FIG. 3). The medium density fibre board with a surface comprising 200 g/m2 of coating 2 show the lowest contact angles.

All in-line coated wood based boards show an increased raw density on the coated surface compared to the reference board. Highest local density values were achieved with coating 2 at a coat weight of 200 g/m2 and coating 1 at a coat weight of 200 g/m2 followed by coating 2 at a coat weight of 100 g/m2 and coating 1 at a coat weight of 100 g/m2 (see FIG. 4).

Figure 5:
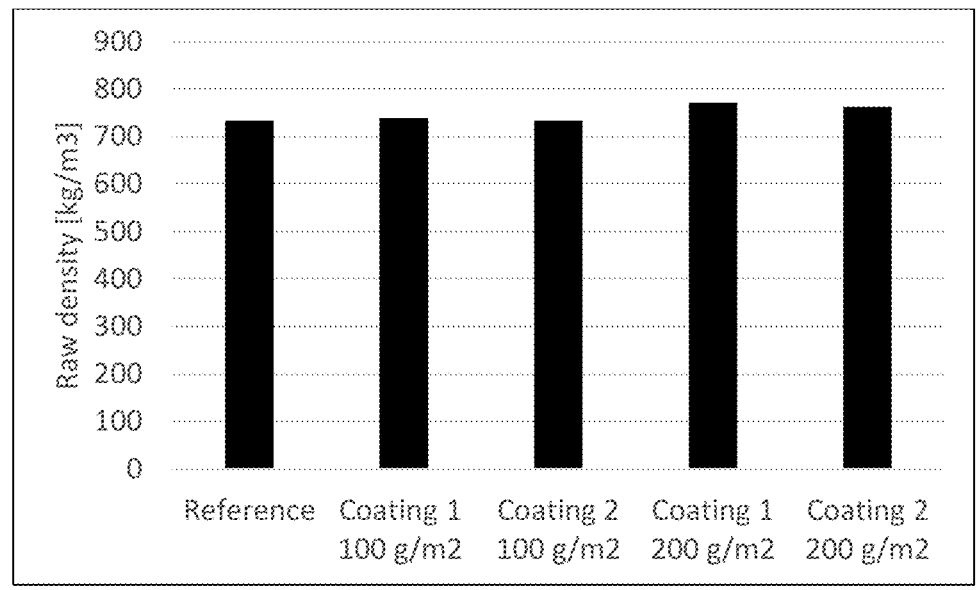
FIG. 5: Overall raw density of medium density fibre boards coated according to the inventive process.

The determined overall raw density of the in-line coated wood-based boards was slightly above the raw density of the reference board (see FIG. 5). All values lie within a range of max 5% difference.

2) Decorative Finishing of in-Line Coated Wood-Based Boards with Decorative Paper The coated medium density fibre boards obtained according to step f) (and the uncoated reference board) were further processed by applying a decorative paper according to step g) of the present invention, onto the coated (or raw) side of the surface of the wood-based boards.

TABLE 6

| Production parameters Decorative paper application | |
| --- | --- |
| Paper D1 | white, filled, 50 g/m$^2$, Kämmerer GmbH |
| Paper D2 | white, filled, 60 g/m$^2$, Kämmerer GmbH |
| Paper D3 | white, filled, 66 g/m$^2$, Kämmerer GmbH |
| Press Type | Short Cycle Press, Höfer |
| Type of Binder | Urea-formaldehyde, K285. 65.5% BASF |
| Amount Of Binder | 20 g/m$^2$ decorative paper |
| Type of Hardener | Bonit 12830 |
| Amount of Hardener | 10% based on solids content of binder |
| Press Temperature | 150° C. |
| Press Time | 60 s |
| Specific Pressing Pressure | 33 bar |

Figure 6:
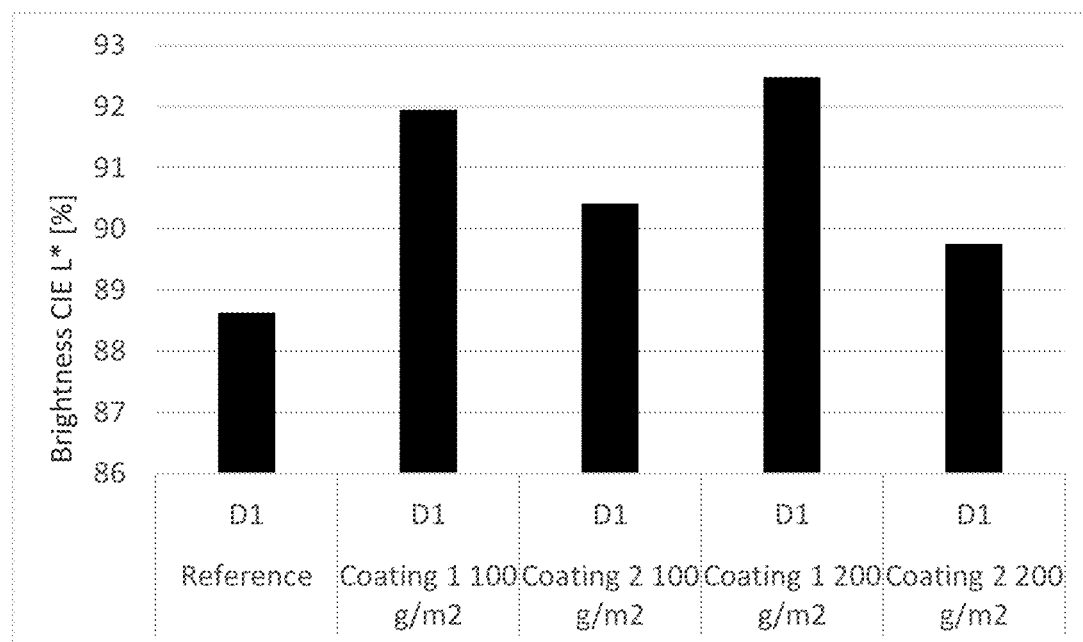
FIG. 6: Brightness CIE L* of the coated surface of medium density fibre boards finished with a 50 g/m² white decorative paper according to the inventive process.
Figure 7:
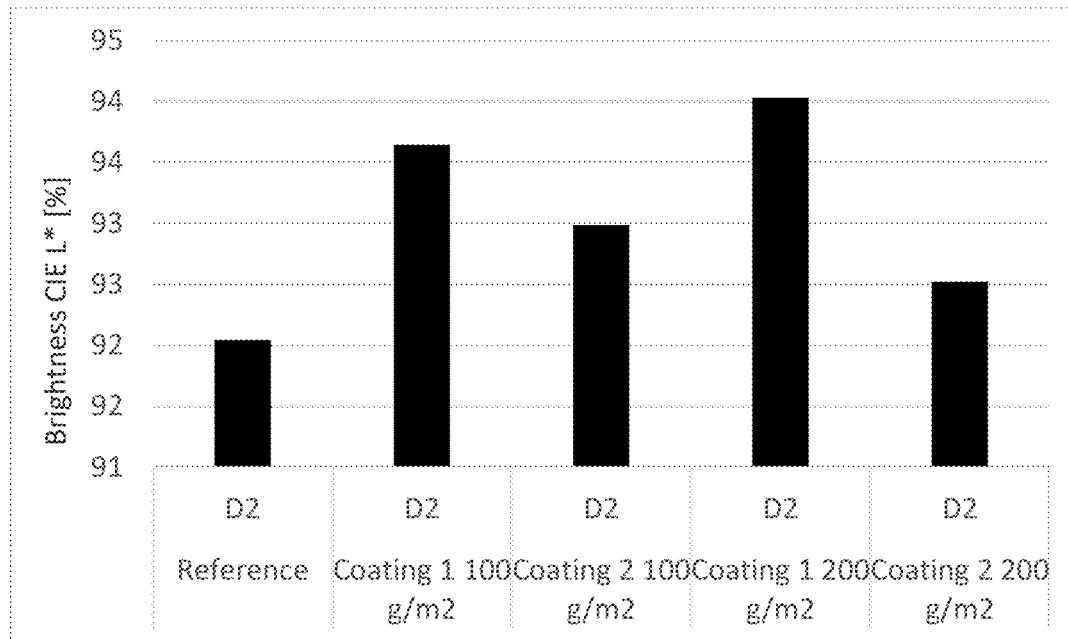
FIG. 7: Brightness CIE L* of the coated surface of medium density fibre boards finished with a 60 g/m² white decorative paper according to the inventive process.
Figure 8:
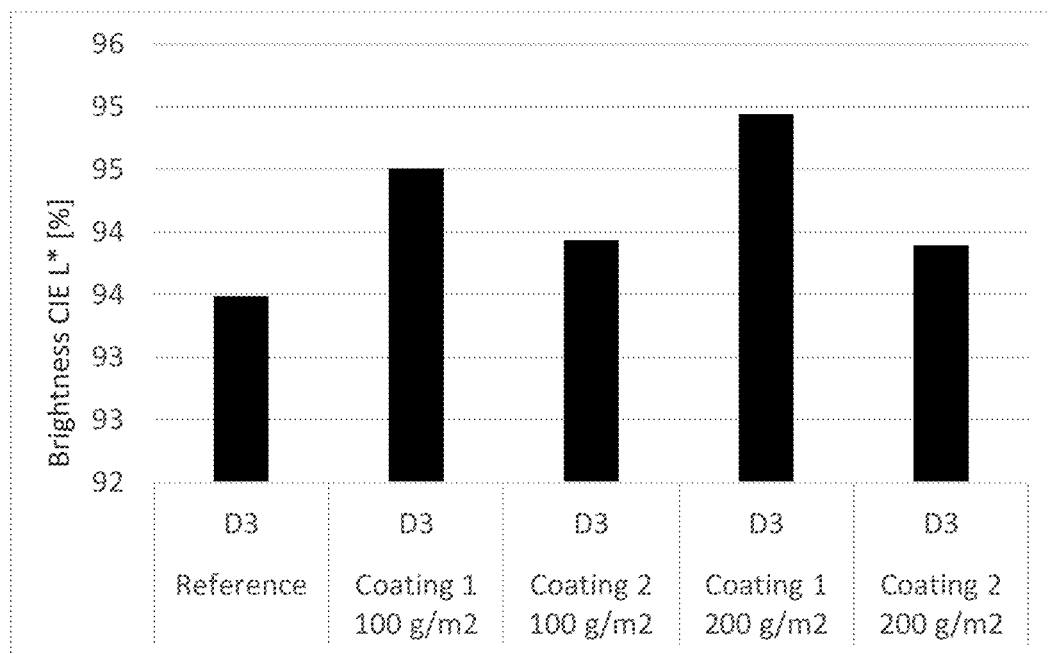
FIG. 8: Brightness CIE L* of the coated surface of medium density fibre boards finished with a 66 g/m² white decorative paper according to the inventive process.

Medium density fibre boards with a white decorative paper applied to the coated side of the board show improved optical parameters and adhesiveness compared to the uncoated board comprising a white decorative paper on the surface of one side (see FIGS. 6 to 8, and Table 7).

The brightness CIE L* of the coated surface of the medium density fibre boards finished with a 50 g/m2, white decorative paper D1 was increased compared to the surface of the uncoated reference board also finished with a 50 g/m2, white decorative paper D1. In the best case (coating 1, 200 g/m2), the brightness CIE L* increases by 4.5% (see FIG. 6).

The brightness CIE L* of the coated surface of the medium density fibre boards finished with a 60 g/m2, white decorative paper D2 was increased compared to the surface of the uncoated reference board also finished with a 60 g/m2, white decorative paper D2. In the best case (coating 1, 200 g/m2), the brightness increases 2.2% (see FIG. 7).

The brightness CIE L* of the coated surface of the medium density fibre boards finished with a 66 g/m2, white decorative paper D3 was increased compared to the surface of the uncoated reference board also finished with a 66 g/m2, white decorative paper D3. In the best case (coating 1, 200 g/m2), the brightness increases 1.5% (see FIG. 8).

TABLE 7

| | Adhesiveness | | |
| --- | --- | --- | --- |
| Trial point | Decorative paper | Cross-cut classification | Spalling predominantly in |
| Reference | D1 | 5 | Substrate |
| Reference | D2 | 5 | Substrate |
| Reference | D3 | 5 | Substrate |
| Coating 1, 100 g/m$^2$ | D1 | 5 | In-line coating layer |
| Coating 1, 100 g/m$^2$ | D2 | 5 | In-line coating layer |
| Coating 1, 100 g/m$^2$ | D3 | 5 | In-line coating layer |
| Coating 2, 100 g/m$^2$ | D1 | 4 | In-line coating layer |
| Coating 2, 100 g/m$^2$ | D2 | 1 | — |
| Coating 2, 100 g/m$^2$ | D3 | 3-4 | In-line coating layer |
| Coating 1, 200 g/m$^2$ | D1 | 5 | In-line coating layer |
| Coating 1, 200 g/m$^2$ | D2 | 3 | In-line coating layer |
| Coating 1, 200 g/m$^2$ | D3 | 4-5 | In-line coating layer |
| Coating 2, 200 g/m$^2$ | D1 | 5 | Substrate |
| Coating 2, 200 g/m$^2$ | D2 | 5 | Substrate |
| Coating 2, 200 g/m$^2$ | D3 | 5 | Substrate |

The adhesiveness of the inventive wood-based board comprising an in-line coated surface and a decorative paper D1, D2 or D3 attached thereon is comparable with the adhesiveness of a wood-based board without an in-line coated surface but with a decorative paper D1, D2 or D3, or is even improved for trial point "coating 2, 100 g/m2, paper D1", "coating 2, 100 g/m2, paper D2", "coating 2, 100 g/m2, paper D3", "coating 1, 200 g/m2, paper D2" and "coating 1, 200 g/m2, paper D3" (see Table 7).

In case of a cross-cut classification of 3-5, the loose, spalled particles were visually inspected and it was evaluated where the cohesion fracture occurred. The cohesion fracture appeared for the reference board in the substrate, meaning that the adhesion of the decorative paper to the surface of the board is stronger than the bonding characteristics of the substrate itself. Comparable to this, the cohesion fracture of the inventive, i.e. surface coated and with decorative paper finished, wood-based boards occurred within the in-line coating layer, meaning that the adhesion of the decorative paper to the surface of the in-line coated wood-based board is strong, too.

3) Decorative Finishing of in-Line Coated Wood-Based Boards by Direct Printing

A decorative finishing of the in-line coated medium density fibre boards obtained according to step f) was carried out by inkjet printing of the four colours cyan (C), magenta (M), yellow (Y) and black (K) with 100% tonal value on the coated side of the boards. An uncoated reference board was also printed for comparison. The printing and curing parameters are displayed in Table 8.

TABLE 8

| Printing and curing parameters | |
| --- | --- |
| Printing parameters | |
| Printer | Hymmen Jupiter JPT-L |
| Size of panels | 250 * 250 mm |
| Printing speed | 25 m/min |
| Ink type | UV-curing Acrylate inks, Hymmen |
| Ink amount | |
| Black | 2.73 g/m$^2$ |
| Cyan/Magenta | 4.17 g/m$^2$ |
| Yellow | 3.19 g/m$^2$ |
| Curing parameters | |
| Printer | UV HG (FE doped) 200 W/cm 100% |
| | UV LED 4x after printing head 100% |

TABLE 8-continued

| Printing and curing parameters | | |
|---|---|---|
| Post-curing | UV Channel HG/Ga | 80 W/cm, 5 m/min, 1550 mj/cm² |

The following results were found by measuring the print gloss and ink density of the four printed colours cyan (C), magenta (M), yellow (Y) and black (K).

Figure 9:
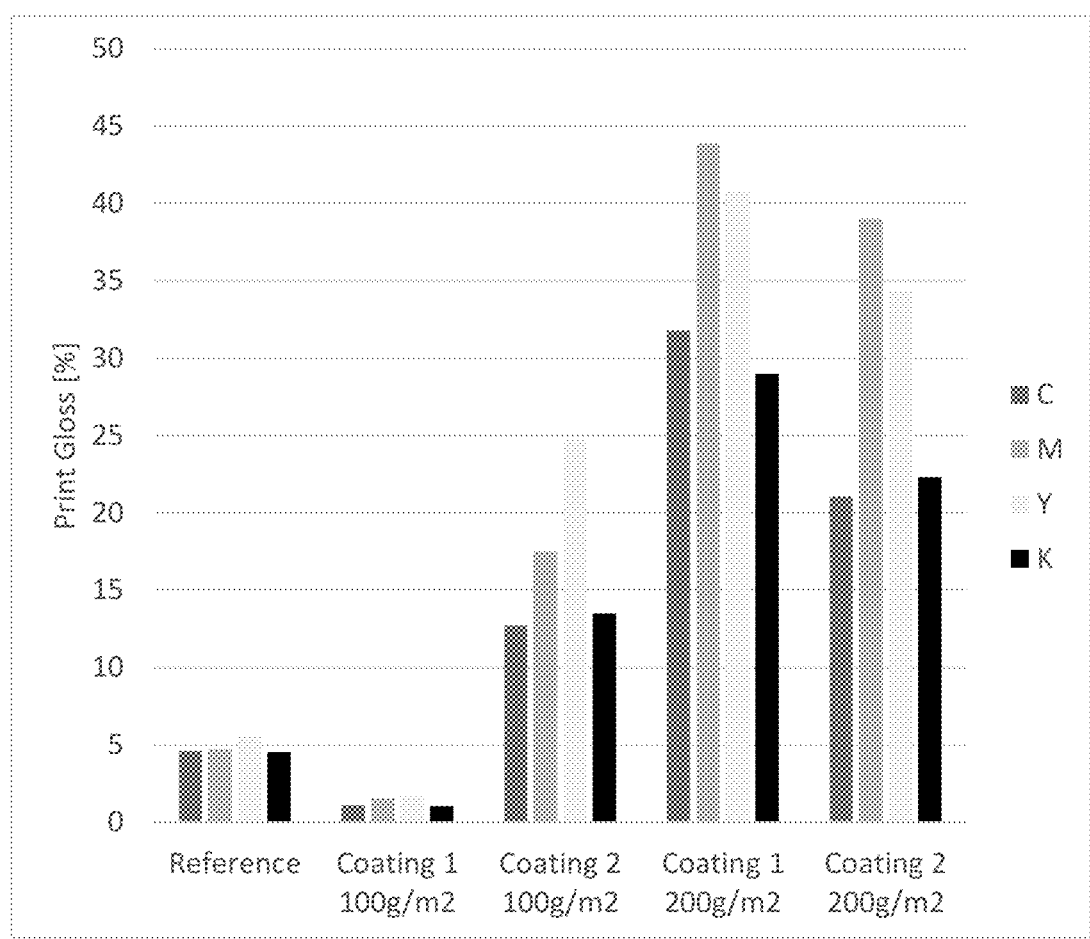
FIG. 9: Print gloss of cyan (C), magenta (M), yellow (Y) and black (K) colour printed by inkjet printing on the coated surface of medium density fibre boards according to the inventive process.

Print Gloss:

The results in FIG. 9 show, that print gloss can be improved by applying coating 1 with 100 g/m², coating 2 with 100 g/m² or 200 g/m² in step e) of the inventive process. The comparison to the uncoated wood-based board shows that the print gloss could be increased from, for example, 4.7% for magenta colour on the reference board to 43.9% for magenta colour on the medium density fibre board with coating 1; 200 g/m².

Figure 10:
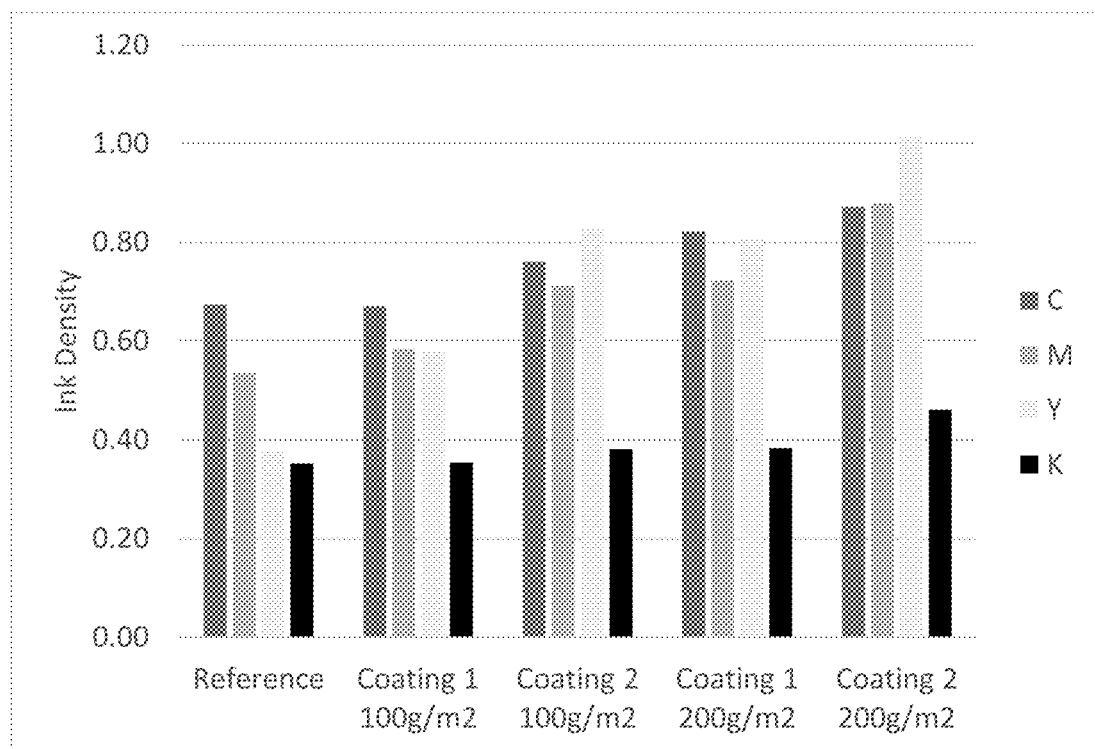
FIG. 10: Ink density of cyan (C), magenta (M), yellow (Y) and black (K) colour printed by inkjet printing on the coated surface of medium density fibre boards according to the inventive process.

Ink Density:

The results in FIG. 10 show that the ink density of inkjet-printed colours cyan (C), magenta (M), yellow (Y) and black (K) is maintained or improved for the inventive wood-based boards compared to the values of the reference board. In the best case, the ink density was increased from 0.38 for yellow colour on the reference board to 1.01 for yellow colour on the medium density fibre board comprising coating 2, 200 g/m². The ink-density of a printed colour is critical to its optical appearance. The higher the ink density of a printed colour is, the fuller or richer a colour appears to the human eye.

The invention claimed is:

1. Process for manufacturing a decorative wood-based board, the process comprising the steps of:
    a) providing wood particles and/or fibres, in dry form or in form of an aqueous suspension,
    b) providing at least one dry or liquid coating composition comprising at least one inorganic particulate filler material and at least one binder, wherein the at least one inorganic particulate filler material comprises at least one inorganic particulate calcium carbonate-containing material having a median particle size $d_{50}$ of 0.1 µm to 150.0 µm and/or a specific surface area of 0.5 to 200.0 m²/g, as measured by the BET nitrogen method,
    c) forming a wood-based mat having a first side and a reverse side from the wood particles and/or fibres provided in step a),
    d) pre-pressing the wood-based mat of step c) into a pre-pressed wood-based mat,
    e) applying at least one layer of the at least one dry or liquid coating composition of step b) on the first and/or reverse side of the pre-pressed wood-based mat obtained in step d),
    f) hot pressing the pre-pressed wood-based mat obtained in step e) into a solid wood-based board, and
    g) applying at least one decorative finishing on the first and/or reverse side of the wood-based board obtained in step f) by a step consisting of at least one of inkjet-printing, rotogravure-printing, and/or applying a decorative paper, a decorative foil or a liquid coating;
    wherein the at least one dry or liquid coating composition of step b) comprises the at least one inorganic particulate filler material in an amount from 80 to 98 wt.-%, and the at least one binder in an amount from 2 to 20 wt.-% based on the total dry weight of the at least one coating composition.

2. The process according to claim 1, wherein the wood particles and/or fibres of step a) are combined simultaneously or separately in any order with at least one base binder and/or at least one additive, preferably the at least one base binder is selected from the group comprising phenol-formaldehyde resin (PF), urea-formaldehyde resin (UF), melamine-formaldehyde resin (MF), melamine-urea-formaldehyde resin (MUF), urea-melamine-formaldehyde resin (UMF), urea-melamine-phenol-formaldehyde resin (UMPF), epoxy resin, methylene diphenyl diisocyanate resin (MDI), polyurethane resin (PU), resorcinol resin, starch or carboxymethylcellulose and mixtures thereof, and/or the at least one additive is selected from the group comprising waxes, colourants, filler, dispersants, biocides, hardener, flame retardants and mixtures thereof.

3. The process according to claim 1, wherein the wood particles of step a) are wood chips.

4. The process according to claim 1, wherein the at least one inorganic particulate calcium carbonate-containing material of step b) is selected from the group consisting of dolomite, ground calcium carbonate (GCC), preferably ground calcium carbonate (GCC) selected from the group comprising marble, chalk, limestone and mixtures thereof, precipitated calcium carbonate (PCC), preferably precipitated calcium carbonate (PCC) selected from the group comprising one or more of the aragonitic, vateritic and calcitic mineralogical crystal forms, modified calcium carbonate (MCC), gypsum, calcine clay, non-calcined (hydrous) clay, bentonite, inorganic pigments and mixtures thereof.

5. The process according to claim 1, wherein the at least one inorganic particulate calcium carbonate-containing material of step b) has a median particle size $d_{50}$ from 0.3 µm to 50.0 µm and/or a specific surface area of from 0.5 to 75.0 m²/g as measured by the BET nitrogen method.

6. The process according to claim 1, wherein the at least one binder of step b) is selected from the group consisting of alkyd resin, epoxy resin, epoxy ester resin, poly(vinyl alcohol), poly(vinyl pyrrolidone), poly(vinyl acetate), poly(oxazolines), poly(vinylacetamides), partially hydrolyzed poly(vinyl acetate/vinyl alcohol), poly((meth)acrylic acid), poly((meth)acrylamide), poly(alkylene oxide), polyether, saturated polyester, sulfonated or phosphated polyesters and polystyrenes, poly(styrene-co-(meth)acrylate), poly(styrene-co-butadiene), polyurethane latex, poly(n-butyl (meth)acrylate), poly(2-ethylhexyl (meth)acrylate), copolymers of (meth)acrylates, such as n-butyl(meth)acrylate and ethyl (meth)acrylate, copolymers of vinylacetate and n-butyl (meth)acrylate casein, copolymers of polyvinylchloride, gelatin, cellulose ethers, zein, albumin, chitin, chitosan, dextran, pectin, collagen derivatives, collodian, agar-agar, arrowroot, guar, carrageenan, starch, tragacanth, xanthan, or rhamsan and mixtures thereof.

7. The process according to claim 1, wherein a single or multi-layer wood-based mat is formed in step c).

8. The process according to claim 1, wherein pre-pressing step d) is carried out at ambient temperature, e.g. from 10 to 60° C., more preferably from 15 to 30° C., and/or a pressure ranging from 5 to 40 bar, preferably from 8 to 35 bar.

9. The process according to claim 1, wherein coating step e) is carried out by metering size press, curtain coating, spray coating or roller coating.

10. The process according to claim 1, wherein coating step e) is carried out on the first and reverse side of the pre-pressed wood-based mat to manufacture a decorative wood-based board being coated on the first and the reverse side, and/or coating step e) is carried out a second time using a different or the same liquid coating composition of step b).

11. The process according to claim 1, wherein hot pressing step f) is carried out at a temperature ranging from 130 to 260° C., more preferably from 160 to 240° C.

12. The process according to claim 1, wherein the decorative wood-based board is a fibre board product, preferably a high-density fibre (HDF) board, medium-density fibre (MDF) board, low-density fibre (LDF) board, a particle board, an oriented strandboard (OSB), a hardboard, or an insulation board.

13. The process according to claim 1, wherein in step g) the at least one decorative finishing is applied as a liquid coating being a lacquer layer.

14. The process according to claim 1, wherein the process comprises the further steps of
h) applying at least one protective layer on the at least one decorative finishing obtained in step g), and/or
i) in case that the at least one decorative finishing is only present on one side, applying at least one backing layer on the side of the decorative wood-based board opposite to the at least one decorative finishing, preferably in form of a paper.

15. A decorative wood-based board, obtained according to the process of claim 1, comprising
a) the solid wood-based board,
b) the at least one coating layer on the first and/or reverse side of the solid wood-based board, wherein the coating comprises
i) the at least one inorganic particulate filler material, having a ratio of particle size $d_{80}$ to particle size $d_{20}$ from 0.5 to 1.0, and
ii) the at least one binder, and
c) the at least one decorative finishing on the first and/or reverse side of the wood-based board.

16. The decorative wood-based board according to claim 15, wherein the at least one decorative finishing is present on the at least one coating layer on the first and/or reverse side of the wood-based board.

17. The decorative wood-based board according to claim 15, wherein the at least one decorative finishing is present on one side of the wood-based board and the at least one coating layer is present on the opposite side of the wood-based board and represents a backing layer or is part of a backing layer.

18. The decorative wood-based board according to claim 15, wherein the at least one inorganic particulate filler material has
i) a particle size $d_{98}$ of <500 μm,
ii) a particle size $d_{80}$ of 0.1 to 250 μm,
iii) a median particle size $d_{50}$ of 0.1 to 150 μm, and
iv) a particle size $d_{20}$ of 0.1 to 50 μm.

19. The decorative wood-based board according to claim 15, wherein the surface of the coated side of the decorative wood-based board has
i) a brightness from 50 to 100%, according ISO R457 (Tappi452) and DIN 6167,
ii) a yellowness from 2 to 70%, according ISO R457 (Tappi452) and DIN 6167,
iii) L* from 50 to 100, according to DIN EN ISO 11664-4:2012,
iv) a* from −5 to 10, according to DIN EN ISO 11664-4:2012, and
v) b* from 0 to 30, according to DIN EN ISO 11664-4:2012.

20. The decorative wood-based board according to claim 15, wherein the at least one coated surface of the decorative wood-based board has
i) a maximum roughness amplitude $S_z$ from 20 to 800 μm,
ii) an arithmetic mean roughness $S_a$ from 2 to 80 μm, and
iii) a root mean square roughness Sq from 2 to 20 μm.

21. The decorative wood-based board according to claim 15, wherein the at least one inorganic particulate filler material has
i) a particle size $d_{98}$ of <500 μm,
ii) a particle size $d_{80}$ of 0.1 to 250 μm,
iii) a median particle size $d_{50}$ of 0.1 to 150 μm, and
iv) a particle size $d_{20}$ of 0.1 to 50 μm,
and the surface of the coated side of the decorative wood-based board has
i) a brightness from 50 to 100%, according ISO R457 (Tappi452) and DIN 6167,
ii) a yellowness from 2 to 70%, according ISO R457 (Tappi452) and DIN 6167,
iii) L* from 50 to 100, according to DIN EN ISO 11664-4:2012,
iv) a* from −5 to 10, according to DIN EN ISO 11664-4:2012, and
v) b* from 0 to 30, according to DIN EN ISO 11664-4:2012,
and
i) a maximum roughness amplitude $S_z$ from 20 to 800 μm,
ii) an arithmetic mean roughness $S_a$ from 2 to 80 μm, and
iii) a root mean square roughness Sq from 2 to 20 μm.

22. The decorative wood-based board according to claim 15, wherein the decorative wood-based board is a fibre board product, preferably a high-density fibre (HDF) board, medium-density fibre (MDF) board, low-density fibre (LDF) board, a particle board, an oriented strandboard (OSB), a hardboard, or an insulation board.

23. The decorative wood-based board according to claim 15, wherein the decorative wood-based board has a bending strength of ≥5 N/mm$^2$, preferably from 10 to 50 N/mm$^2$ and most preferably from 15 to 45 N/mm$^2$; and/or a modulus of elasticity of ≥500 N/mm$^2$, preferably from 1 000 to 4 500 N/mm$^2$ and most preferably from 1 500 to 3 500 N/mm$^2$; and/or an internal bond strength of ≥0.10 N/mm$^2$, more preferably from 0.2 to 1.4 N/mm$^2$ and most preferably from 0.4 to 1.2 N/mm$^2$; and/or a thickness swelling after 24 h water storage of ≤20%, more preferably from 2.0 to 15.0% and most preferably from 4.0 to 10%; and/or a brightness of at least 50%, more preferably of at least 65%, even more preferably of at least 75% and most preferably of at least 80%.

24. The decorative wood-based board according to claim 15, wherein the at least one coated side of the decorative wood-based board has a surface density ranging from 900 to 2 500 kg/m$^3$, preferably from 1 200 to 2 400 kg/m$^3$ and most preferably from 1 600 to 2 300 kg/m$^3$.

25. The decorative wood-based board according to claim 15, wherein the decorative wood-based board further comprises
d) at least one protective layer on the at least one decorative finishing and/or
e) in case that the at least one decorative finishing is only present on one side, at least one backing layer on the side of the decorative wood-based board opposite to the at least one decorative finishing, preferably in form of a paper.

26. The decorative wood-based board according to claim 25, wherein the at least one protective layer comprises a transparent non-thermoplastic resin, preferably selected from the group consisting of urea-formaldehyde resins, melamine-resins, epoxy-resins and mixtures thereof.

27. The decorative wood-based board according to claim 15, wherein the at least one dry or liquid coating composition is used to improve the mechanical properties of the decorative wood-based board, the mechanical properties being selected from bending strength, modulus of elasticity, internal bond strength and/or thickness swelling.

28. Flooring applications, furniture, walls, wall panels, roof panels, display cabinets, storage units, loudspeakers, loudspeaker boxes and shop-fittings comprising the decorative wood-based board according to claim 16.

* * * * *

UNITED STATES PATENT AND TRADEMARK OFFICE
CERTIFICATE OF CORRECTION

| | |
|---|---|
| PATENT NO. | : 11,633,874 B2 |
| APPLICATION NO. | : 16/500642 |
| DATED | : April 25, 2023 |
| INVENTOR(S) | : Schrul et al. |

It is certified that error appears in the above-identified patent and that said Letters Patent is hereby corrected as shown below:

In the Claims

Column 49, Line 12: Claim 28, Delete "claim 16." and insert -- claim 15. --

Signed and Sealed this
Sixth Day of June, 2023

Katherine Kelly Vidal
*Director of the United States Patent and Trademark Office*